US007370271B2

(12) United States Patent
Killen et al.

(10) Patent No.: US 7,370,271 B2
(45) Date of Patent: May 6, 2008

(54) METHODS AND APPARATUS FOR GENERATING A SPREADSHEET REPORT TEMPLATE

(75) Inventors: Brian Killen, Lawrence, KS (US);
Brian D. Jackson, Belton, MO (US);
Jason Douglas Boehle, Lawrence, KS (US); Kaleb C. Axon, Overland Park, KS (US)

(73) Assignee: Actuate Corporation, San Mateo, CA (US)

( * ) Notice: Subject to any disclaimer, the term of this patent is extended or adjusted under 35 U.S.C. 154(b) by 486 days.

(21) Appl. No.: 10/411,528

(22) Filed: Apr. 9, 2003

(65) Prior Publication Data
US 2004/0088650 A1 May 6, 2004

Related U.S. Application Data

(60) Provisional application No. 60/423,091, filed on Oct. 30, 2002.

(51) Int. Cl.
*G06F 17/00* (2006.01)

(52) U.S. Cl. ...................... 715/503; 715/513

(58) Field of Classification Search ................ 715/513, 715/503, 504
See application file for complete search history.

(56) References Cited

U.S. PATENT DOCUMENTS

| 4,745,560 A | 5/1988 | Decker et al. |
| 4,932,021 A | 6/1990 | Moody |
| 5,272,767 A | 12/1993 | Asmuth et al. |
| 5,448,691 A | 9/1995 | Motoyama |
| 5,473,687 A | 12/1995 | Lipscomb et al. |
| 5,491,796 A | 2/1996 | Wanderer et al. |
| 5,523,942 A | 6/1996 | Tyler et al. |

(Continued)

OTHER PUBLICATIONS

Seagate Crystal Reports Version 8 User's Guide, Seagate Software, 1999, pp. 22, 31-32, 55, 79-82, 104-152, 189-191, 286-303, 306-309, 456-462, 472-484, 589-590, 607-621.*

(Continued)

*Primary Examiner*—William Bashore
*Assistant Examiner*—Laurie Ries
(74) *Attorney, Agent, or Firm*—Weaver Austin Villeneuve & Sampson LLP

(57) ABSTRACT

Methods and apparatus for generating a report template for generation of a spreadsheet report are disclosed. First, a grid including a plurality of cells is displayed. One or more database fields for which data is to be obtained from a database are identified, where each of the database fields is associated with a separate group with which one or more rows in the grid can be associated. One or more groups as defined by the one or more database fields are then associated with a corresponding set of one or more rows in the grid, thereby associating cells within the set of rows with the corresponding group. A user may then enter information within one or more of the plurality of cells of the displayed grid, where the received information indicates at least one of a format of the spreadsheet report to be created and information to be displayed in one or more cells of the spreadsheet report. The report template is then generated from the received information such that the groups are associated with the received information corresponding to placement of the received information within the grid. The received information may, for instance, include a formula or formatting commands.

77 Claims, 25 Drawing Sheets

U.S. PATENT DOCUMENTS

| | | | |
|---|---|---|---|
| 5,574,898 | A | 11/1996 | Leblang et al. |
| 5,579,519 | A | 11/1996 | Pelletier et al. |
| 5,586,255 | A | 12/1996 | Tanaka et al. |
| 5,621,889 | A | 4/1997 | Lermuzeaux et al. |
| 5,629,846 | A | 5/1997 | Crapo |
| 5,664,182 | A | 9/1997 | Nierenberg et al. |
| 5,706,365 | A | 1/1998 | Rangarajan et al. |
| 5,724,581 | A | 3/1998 | Kozakura |
| 5,727,145 | A | 3/1998 | Nessett et al. |
| 5,812,983 | A * | 9/1998 | Kumagai ............... 705/3 |
| 5,826,268 | A | 10/1998 | Schaefer et al. |
| 5,845,304 | A | 12/1998 | Iijima |
| 5,884,035 | A | 3/1999 | Butman et al. |
| 6,014,666 | A | 1/2000 | Helland et al. |
| 6,148,379 | A | 11/2000 | Schimmel |
| 6,185,576 | B1 | 2/2001 | McIntosh |
| 6,205,452 | B1 | 3/2001 | Warmus et al. |
| 6,249,794 | B1 | 6/2001 | Raman |
| 6,260,044 | B1 | 7/2001 | Nagral et al. |
| 6,295,559 | B1 | 9/2001 | Emens et al. |
| 6,317,837 | B1 | 11/2001 | Kenworthy |
| 6,321,230 | B1 | 11/2001 | Joslin et al. |
| 6,332,146 | B1 | 12/2001 | Jebens et al. |
| 6,772,156 | B1 | 8/2004 | Rogers et al. |
| 6,859,805 | B1 | 2/2005 | Rogers et al. |
| 6,920,608 | B1 * | 7/2005 | Davis ................... 715/503 |
| 6,948,154 | B1 * | 9/2005 | Rothermel et al. ...... 717/128 |
| 2001/0018708 | A1 | 8/2001 | Shisler et al. |
| 2002/0013786 | A1 * | 1/2002 | Machalek ............. 707/503 |
| 2002/0055952 | A1 * | 5/2002 | Clancey et al. ......... 707/504 |
| 2002/0091728 | A1 * | 7/2002 | Kjaer et al. ............ 707/503 |
| 2003/0110191 | A1 * | 6/2003 | Handsaker et al. ..... 707/503 |
| 2005/0203819 | A1 | 9/2005 | Rogers et al. |

OTHER PUBLICATIONS

Lucas, Steve, et al, Special Edition Using Crystal Enterprise 8.5, Que Corporation, Jun. 2002, pp. 247-259.*

Dobbs, Verlynda, et al, "A Methodology for the Design and Implementation of Virtual Interfaces", Proceedings of the 1985 ACM Annual Conference on The Range of Computing, Oct. 1985, pp. 158-173.* http://www.webopedia.com, definition of "template", as defined in the American Heritage Dictionary of the English Language, Fourth Edition, 2000.*

Moseley, Lonnie E., et al, "Mastering Microsoft Office 97 Professional Edition", Sybex Inc., 1996, pp. 455-520.*

Microsoft Computer Dictionary, Third Edition, Microsoft Press, 1997, pp. 488.*

Product Brochure for "Adobe Acrobat" available from Adobe Systems, Incorporated, 1994.

Product Brochure for "Crystal Reports, v.3" available from Crystal Computer Services, Inc.

Release regarding "Crystal Info" application available from Crystal Computer Services, Inc., 1996.

Product Brochure for "Crystal Reports Server, v. 4" available from Crystal Services, 1994.

Product Brochure for "Business Objects" available from Business Objects, Incorporated, 1993.

Product Brochure for "IQ Intelligent Query for Windows v. 4.0" available from IQ Software Corporation, 1994.

* cited by examiner

|   | A | B | C | D |
|---|---|---|---|---|
| 1 | cust | order | price | quantity |
| 2 | 01 | 2345 | 98.75 | 100 |
| 3 | 01 | 2345 | 5.95 | 50 |
| 4 | 01 | 4531 | 29.74 | 20 |
| 5 | 01 | 4531 | 5.95 | 24 |
| 6 | 02 | 5001 | 59.34 | 100 |
| 7 | 02 | 5001 | 5.95 | 50 |
| 8 | 02 | 6321 | 48.78 | 20 |
| 9 | 02 | 6321 | 5.95 | 24 |

*FIG. 3*

|   | A | B | C | D | E |   |
|---|---|---|---|---|---|---|
| 1 | [cust] | | | | | Cust group |
| 2 | | [order] | | | | Order group |
| 3 | | | [price] | [quantity] | =C3*D3 | Row group |
| 4 | | | | | =SUM(@E3) | Order group |
| 5 | | | | | =SUM(@E3) | Cust group |

*FIG. 4*

Unqualified-expanded

|   | A  | B    | C    | D   | E                  |   |
|---|----|------|------|-----|--------------------|---|
| 1 | 01 |      |      |     |                    |   |
| 2 |    | 2345 |      |     |                    |   |
| 3 |    |      | 98.8 | 100 |                    |   |
| 4 |    |      | 5.95 | 50  |                    |   |
| 5 |    |      |      |     | =SUM(E3:E4)        | O |
| 6 |    | 4531 |      |     |                    |   |
| 7 |    |      | 29.7 | 20  |                    |   |
| 8 |    |      | 5.95 | 24  |                    |   |
| 9 |    |      |      |     | =SUM(E7:E8)        | O |
| 10|    |      |      |     | =SUM(E3:E4,E7:E8)  | C |
| 11| 02 |      |      |     |                    |   |
| 12|    | 5001 |      |     |                    |   |
| 13|    |      | 59.3 | 100 |                    |   |
| 14|    |      | 5.95 | 50  |                    |   |
| 15|    |      |      |     | =SUM(E13:E14)      | O |
| 16|    | 6321 |      |     |                    |   |
| 17|    |      | 48.8 | 20  |                    |   |
| 18|    |      | 5.95 | 24  |                    |   |
| 19|    |      |      |     | =SUM(E17:E18)      | O |
| 20|    |      |      |     | =SUM(E13:E14,E17:E18) | C |

FIG. 5

Qualified-design

|   | A      | B       | C       | D          | E           | F         |
|---|--------|---------|---------|------------|-------------|-----------|
| 1 | [cust] |         |         |            |             |           |
| 2 |        | [order] |         |            |             |           |
| 3 |        |         | [price] | [quantity] |             |           |
| 4 |        |         |         |            | =F3/@cust!F5 | =SUM(@E3) |
| 5 |        |         |         |            |             | =SUM(@E3) |

FIG. 6

Qualified-expanded

|    | A  | B    | C    | D   | E        | F                  |
|----|----|------|------|-----|----------|--------------------|
| 1  | 01 |      |      |     |          |                    |
| 2  |    | 2345 |      |     |          |                    |
| 3  |    |      | 98.8 | 100 | =F3/F10  | =C3*D3             |
| 4  |    |      | 5.95 | 50  | =F4/F10  | =C4*D4             |
| 5  |    |      |      |     |          | =SUM(E3,E4)        |
| 6  |    | 4531 |      |     |          |                    |
| 7  |    |      | 29.7 | 20  | =F7/F10  | =C7*D7             |
| 8  |    |      | 5.95 | 24  | =F8/F10  | =C8*D8             |
| 9  |    |      |      |     |          | =SUM(E7,E8)        |
| 10 |    |      |      |     |          | =SUM(E3,E4,E7,E8)  |
| 11 | 02 |      |      |     |          |                    |
| 12 |    | 5001 |      |     |          |                    |
| 13 |    |      | 59.3 | 100 | =F13/F20 | =C13*D13           |
| 14 |    |      | 5.95 | 50  | =F14/F20 | =C14*D14           |
| 15 |    |      |      |     |          | =SUM(E13,E14)      |
| 16 |    | 6321 |      |     |          |                    |
| 17 |    |      | 48.8 | 20  | =F17/F20 | =C17*D17           |
| 18 |    |      | 5.95 | 24  | =F18/F20 | =C18*D18           |
| 19 |    |      |      |     |          | =SUM(E17,E18)      |
| 20 |    |      |      |     |          | =SUM(E13,E14,E17,E18) |

FIG. 7 drml.txt

```
<range version="930">
    <groups>
        <group name="cust" virtual-ranges="E3">
            <group name="order" virtual-ranges="E3">
                <group name="Row"/>
            </group>
        </group>
    </groups>                          ,1002
    </row begin-group="cust">    ◄──── first row of cust
        <cell>01</cell>
    </row>                        ,1004
    <row begin-group="order">    ◄──── 1st row of order
        <cell></cell>
        <cell>2345</cell>
    </row>
    <row>
        <cell></cell>
        <cell></cell>
        <cell>98.75</cell>
        <cell>100</cell>                 ,1006
        <cell formula='C3*D3' virtual-names="E3"/>
    </row>
    <row>
        <cell></cell>
        <cell></cell>
        <cell>5.95</cell>
        <cell>50</cell>
        <cell formula='C3*D3' virtual-names="E3"/>
    </row>
    <row>
        <cell></cell>
        <cell></cell>
        <cell></cell>
        <cell></cell>
        <cell formula='SUM(@order!E3)' >
    </row>
    <row begin-group="order">    ◄──── 2nd order
        <cell></cell>
        <cell>4531</cell>
    </row>
    <row>
        <cell></cell>
        <cell></cell>
        <cell>29.7</cell>
        <cell>20</cell>
        <cell formula='C3*D3' virtual-names="E3"/>
    </row>
    <row>
        <cell></cell>
        <cell></cell>
        <cell>5.95</cell>
        <cell>24</cell>
```

*FIG. 11*

Before and After Examples

|   | F | G | H |   |
|---|---|---|---|---|
| 3 |   |   |   | C |
| 4 |   |   |   | O |
| 5 |   |   |   | I |
| 6 | =SUM(@Order.G5)/SUM(@Cust.H6) |   |   | O |
| 7 |   |   |   | C |

FIG. 12A

|    | F | G | H |   |
|----|---|---|---|---|
| 3  |   |   |   | C |
| 4  |   |   |   | O |
| 5  |   |   |   | I |
| 6  |   |   |   | I |
| 7  | =SUM($G$5:$G$6)/SUM($H$7) |   |   | O |
| 8  |   |   |   | C |
| 9  |   |   |   | C |
| 10 |   |   |   | O |
| 11 | =SUM(#NULL!)/SUM(($H$11,$H$14)) |   |   | O |
| 12 |   |   |   | O |
| 13 |   |   |   | I |
| 14 | =SUM($G$13)/SUM(($H$11,$H$14)) |   |   | O |
| 15 |   |   |   | C |

FIG. 12B

|   | F | G | H |   |
|---|---|---|---|---|
| 3 |   |   |   | c |
| 4 |   |   |   | o |
| 5 |   |   |   | l |
| 6 |   |   |   | l |
| 7 | =SUM($G$5:$G$6)/SUM($H$7) |   |   | o |
| 8 |   |   |   | c |
| 9 |   |   |   | c |
| 10 |   |   |   | o |
| 11 |   |   |   | o |
| 12 |   |   |   | o |
| 13 |   |   |   | l |
| 14 |   |   |   | o |
| 15 |   |   |   | c |

@Cust.H6 Resolved in F7

F7 Formula (fully resolved)

Template Formula

Order.G5 VRef

Cust.H6 VRef

*FIG. 18*

All Virtual References Resolved

| | F | G | H | |
|---|---|---|---|---|
| 3 | | | | c |
| 4 | | | | o |
| 5 | | | | – |
| 6 | | | | – |
| 7 | =SUM($G$5:$G$6)/SUM($H$7) | | | o |
| 8 | | | | c |
| 9 | | | | c |
| 10 | | | | o |
| 11 | =SUM(#NULL!)/SUM(($H$11,$H$14)) | | | o |
| 12 | | | | o |
| 13 | | | | – |
| 14 | =SUM($G$13)/SUM(($H$11,$H$14)) | | | o |
| 15 | | | | c |

| F7 Formula (fully resolved) |
| F11 Formula (fully resolved) |
| F14 Formula (fully resolved) |

Template Formula

| Order.G5 VRef |
| Cust.H6 VRef |

*FIG. 22*

Result

|    | A | B | C | D | E |
|----|---|---|---|---|---|
| 1  | Customer 01 | | | | |
| 2  | | Order 2345 | | | |
| 3  | | | $ 98.75 | 100 | $ 9,875.00 |
| 4  | | | $ 5.95 | 50 | $ 297.50 |
| 5  | | | | | $ 10,172.50 |
| 6  | | Order 4531 | | | |
| 7  | | | $ 29.74 | 20 | $ 594.80 |
| 8  | | | $ 5.95 | 24 | $ 142.80 |
| 9  | | | | | $ 737.60 |
| 10 | | | | | $ 10,910.10 |
| 11 | Customer 02 | | | | |
| 12 | | Order 5001 | | | |
| 13 | | | $ 59.34 | 100 | $ 5,934.00 |
| 14 | | | $ 5.95 | 50 | $ 297.50 |
| 15 | | | | | $ 6,231.50 |
| 16 | | Order 6321 | | | |
| 17 | | | $ 48.78 | 20 | $ 975.60 |
| 18 | | | $ 5.95 | 24 | $ 142.80 |
| 19 | | | | | $ 1,118.40 |
| 20 | | | | | $ 7,349.90 |

*FIG. 23*

Report Range

| | A | B | C | D | E | F | G | H | I |
|---|---|---|---|---|---|---|---|---|---|
| K11 | | fx | | | | | | | |
| 1 | Customer [cust] | | | | | | | cust | |
| 2 | | | | | | | | | |
| 3 | | Order [order] | | | | | | order | |
| 4 | | | | | | | | | |
| 5 | | | =[code] | =[price] | =[quantity] | =D5*E5 | | row | |
| 6 | | | | | | =SUM(@F5) | | order | |
| 7 | | | | | | | | | |
| 8 | | | | | | =SUM(@F5) | | cust | |

*FIG. 24*

Report Group

| | A | B | C | D | E | F | G | H | I |
|---|---|---|---|---|---|---|---|---|---|
| K11 | | fx | | | | | | | |
| 1 | Customer [cust] | | | | | | | cust | |
| 2 | | | | | | | | | |
| 3 | | Order [order] | | | | | | order | |
| 4 | | | | | | | | | |
| 5 | | | =[code] | =[price] | =[quantity] | =D5*E5 | | row | |
| 6 | | | | | | =SUM(@F5) | | order | |
| 7 | | | | | | | | | |
| 8 | | | | | | =SUM(@F5) | | cust | |

*FIG. 25*

Report Band

| K11 | | $fx$ | | | | | | |
|---|---|---|---|---|---|---|---|---|
| | A | B | C | D | E | F | G | H | I |
| 1 | Customer [cust] | | | | | | | cust |
| 2 | | | | | | | | |
| 3 | Order [order] | | | | | | | order |
| 4 | | | | | | | | |
| 5 | | | =[code] | =[price] | =[quantity] | =D5*E5 | | row |
| 6 | | | | | | =SUM(@F5) | | order |
| 7 | | | | | | | | |
| 8 | | | | | | =SUM(@F5) | | cust |

*FIG. 26*

Banding Guide

| K11 | | $fx$ | | | | | | |
|---|---|---|---|---|---|---|---|---|
| | A | B | C | D | E | F | G | H | I |
| 1 | Customer [cust] | | | | | | | cust |
| 2 | | | | | | | | |
| 3 | Order [order] | | | | | | | order |
| 4 | | | | | | | | |
| 5 | | | =[code] | =[price] | =[quantity] | =D5*E5 | | row |
| 6 | | | | | | =SUM(@F5) | | order |
| 7 | | | | | | | | |
| 8 | | | | | | =SUM(@F5) | | cust |

*FIG. 27*

Virtual Range Reference

K11 ▶  *fx*

| | A | B | C | D | E | F | G | H | I |
|---|---|---|---|---|---|---|---|---|---|
| 1 | | | | | | | | cust | |
| 2 | Customer [cust] | | | | | | | | |
| 3 | | | Order [order] | | | | | order | |
| 4 | | | | | | | | | |
| 5 | | | =[code] | =[price] | =[quantity] | =D5*E5 | | row | |
| 6 | | | | | | =SUM(@F5) | | | |
| 7 | | | | | | | | order | |
| 8 | | | | | | =SUM(@F5) | | cust | |

*FIG. 28*

METHODS AND APPARATUS FOR GENERATING A SPREADSHEET REPORT TEMPLATE

RELATED APPLICATIONS

This application claims priority from Ser. No. 60/423,091, entitled "Methods and Apparatus for Generating a Spreadsheet Report Template," naming B. Killen, et al. as inventors, filed on Oct. 30, 2002, which is incorporated herein by reference in its entirety for all purposes.

BACKGROUND OF THE INVENTION

The present invention relates to computer-implemented systems and methods for generating a report template. More specifically, the invention relates to systems and methods for editing, generating and storing such report templates for generating a spreadsheet report.

Business professionals often deal with large amounts of data in the form of reports. Such reports may be generated from much larger collections of data stored in business databases. A typical report accesses dozens to thousands of records (or more) and requires a few seconds to many hours to generate. Typically, the records appearing in a report are organized by one or more level breaks after which totals or subtotals of numerical data are provided. In addition, most reports are highly formatted to provide relevant background information and facilitate understanding. A single report may be related to other reports, and a whole group of reports may be used by many people associated with an enterprise all of whom need to see the same consistent set of information. Examples of such reports include reports containing records of open orders, sales forecasts, customer statements, and balance sheets.

One type of report that is commonly used is the spreadsheet. A spreadsheet is a grid including a plurality of cells in which formulas may be applied to contents of one or more of the cells within the spreadsheet. Specifically, formulas within a spreadsheet typically refer to cells in the spreadsheet by row and column (e.g., A4). Typically, the contents of the cells of a spreadsheet include values obtained from a data source such as a database. Thus, once the values are obtained from the database, the formulas may be applied.

Typically, when a spreadsheet is used, the information in the spreadsheet is primarily numeric. This numeric information, as well as higher-level information such as subtotals, is often manually entered into the spreadsheet. However, in order to generate a useful report, additional textual information such as headers are also manually pasted into the spreadsheet. Even once the textual and numeric information is entered into the spreadsheet, this information must often be manually formatted to achieve the desired appearance of the spreadsheet report. Unfortunately, this is a time-consuming, error-prone and tedious process.

Various products have been developed which enable a report to be generated more efficiently. For instance, the XSL (Extensible Stylesheet Language) style sheet enables a text-based language to be used to generate computer code to filter and format data that is entered into a spreadsheet. Unfortunately, this process is similar to computer programming, and is therefore a tedious process that is error-prone. Moreover, since the language is text-based, it is difficult to generate a report in a format that is desired since the end result cannot be viewed until the code is completed and run.

Other products provide translation tools that enable a report to be generated from another document. For instance, Crystal report software, available from Crystal Decisions, located in Palo Alto, Calif., provides translation capabilities. However, this requires that a useable report already exist in another format. Moreover, such products do not enable a report to be generated from an interface that enables the user to view the report format in a graphical interface such as a spreadsheet.

In view of the above, it would be desirable if an automated process for generating a report from a spreadsheet could be developed. Moreover, it would be beneficial if such a report could be formatted and generated from within a graphical user interface such as a spreadsheet.

SUMMARY OF THE INVENTION

Methods and apparatus for creating a report template for generation of a spreadsheet report are disclosed. This is accomplished through the use of a user interface representing a spreadsheet format. In this manner, a user may efficiently and accurately create a report template for generating a template report.

In accordance with one aspect of the invention, a report template is generated. First, a grid including a plurality of cells is displayed. One or more database fields for which data is to be obtained from a database are identified (e.g., from a user database query). Each of the database fields is associated with a separate group with which one or more rows in the grid can be associated. One or more groups as defined by the one or more database fields are then associated with a corresponding set of one or more rows in the grid (e.g., via the spreadsheet user interface), thereby associating cells within the set of rows with the corresponding group. A user may then enter information within one or more of the plurality of cells of the displayed grid, where the received information indicates at least one of a format of the spreadsheet report to be created and information to be displayed in one or more cells of the spreadsheet report. For instance, the information that indicates information to be displayed in one or more cells may include one or more formulas. In the following description, these formulas may be referred to as formulas or template formulas. The report template is then generated from the received information such that the groups are associated with the received information corresponding to placement of the received information within the grid. The received information may, for instance, include a formula or formatting commands. Thus, the report template associates the groups with formatting information and/or any formulas that are entered by the user in cells of the grid.

In accordance with another aspect of the invention, a spreadsheet user interface is provided. Specifically, the present invention enables a user to create a report from within a spreadsheet format. In other words, the user views and establishes the format of the report to be generated from within what appears to be a spreadsheet. This enables the user to efficiently and accurately view and edit the representation of the report to be generated. In addition, a user "banding guide" or legend is provided which enables the user to identify and modify those groups that are associated with various rows of the grid of the spreadsheet report template (and therefore the report that will eventually be generated using the spreadsheet report template). Specifically, the legend is preferably displayed adjacent to the grid. In this manner, the banding guide assists the user in entering template formulas in the desired cells of the grid.

In accordance with yet another aspect of the invention, a formula (i.e., template formula) entered within a cell of the grid associated with a report template may include a virtual reference. While a conventional formula refers to specific cells within the grid to which the formula is to be applied, a formula in accordance with the present invention includes a virtual-reference. Specifically, a virtual reference refers to one or more "virtual cell locations" within the grid to which the associated formula is to be applied. Each of the "virtual cell locations" is capable of being converted to one or more actual cell locations within the grid corresponding to expected placement of the data within a spreadsheet report after data is obtained from a data base. This conversion is referred to herein as "expansion" or "resolution" of the virtual references. This expansion is preferably performed during generation of a report from the report template. When a virtual reference is resolved, the virtual cell location(s) are converted to one or more actual cell location(s) within the grid corresponding to expected placement of the data. The reference to the virtual cell location(s) is then replaced with a reference to the actual cell location(s). In accordance with one embodiment, a virtual reference is distinguished from a conventional cell or range reference (e.g., actual specific cell references) through the use of a predefined symbol such as "@".

These and other features of the present invention will be presented in more detail in the following detailed description of the invention and the associated figures.

BRIEF DESCRIPTION OF THE DRAWINGS

FIG. 3 is a diagram illustrating exemplary data obtained from a database.

FIG. 4 is a diagram illustrating an exemplary report template including multiple groups and virtual references that is generated in accordance with various embodiments of the invention.

FIG. 5 is a diagram illustrating an exemplary report template in which the unqualified virtual references of FIG. 4 have been expanded in accordance with various embodiments of the invention.

FIG. 6 is a diagram illustrating an exemplary report template in which the group of cells referenced by the virtual reference is qualified but not expanded in accordance with various embodiments of the invention.

FIG. 7 is a diagram illustrating an exemplary report template in which the qualified virtual reference of FIG. 6 has been expanded in accordance with various embodiments of the invention.

FIG. 11 is a diagram illustrating an exemplary DRML language file in which groups are labeled in accordance with one embodiment of the invention.

FIGS. 12A and 12B are diagrams illustrating an exemplary report template including a formula with a virtual reference before and after expansion of that virtual reference.

FIG. 18 is a diagram illustrating the use of the data structure of FIG. 13 after complete expansion of a virtual reference such as the virtual reference of FIG. 12A for the first customer.

FIG. 22 is a diagram illustrating the report template after complete expansion of the virtual reference of FIG. 12A for both customers.

FIG. 23 is a diagram illustrating an exemplary report generated from a report template in accordance with various embodiments of the invention.

FIG. 24 is a diagram illustrating a selection of a report range within an editor in accordance with various embodiments of the invention.

FIG. 25 is a diagram illustrating a selection of a report group within an editor in accordance with various embodiments of the invention.

FIG. 26 is a diagram illustrating a selection of a report band within an editor in accordance with various embodiments of the invention.

FIG. 27 is a diagram illustrating a banding guide provided in accordance with various embodiments of the invention.

FIG. 28 is a diagram illustrating a virtual reference in association with a customer report group in accordance with various embodiments of the invention.

DESCRIPTION OF THE PREFERRED EMBODIMENTS

Figure 1:
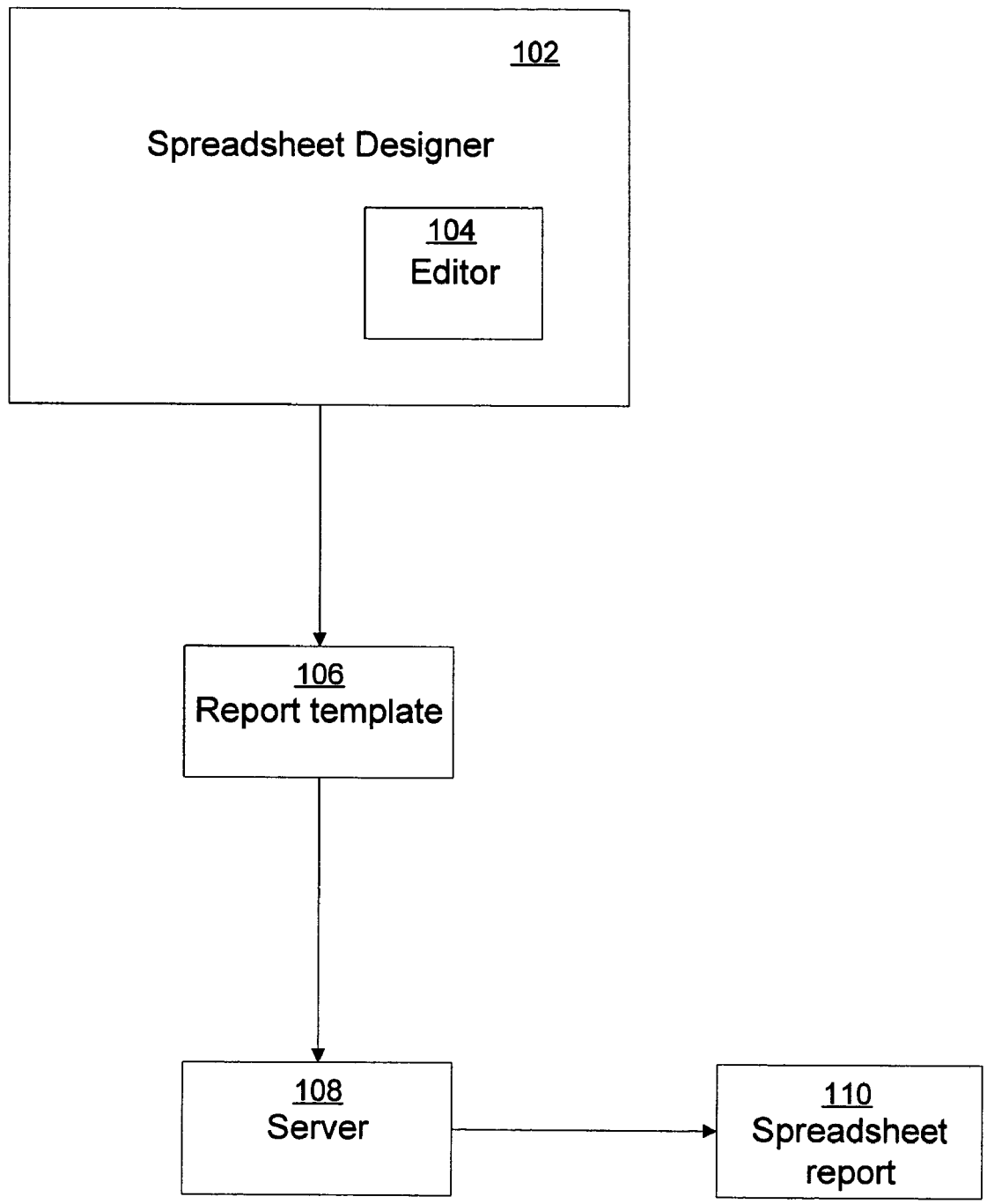
FIG. 1 is a block diagram illustrating a system in which the present invention may be implemented.

A "report" generally is a highly formatted list of data containing several, even thousands of records. Very often, reports are characterized by "level breaks" between members of a group of records provided in the report.

A "section" is a part of a report containing data having a common feature or purpose. Most reports contain sections separated by level breaks. However, other sections may also be used. These include, for example, sequential or parallel sections containing different types of data. For example, the data for a given customer in a report may be divided into an order section describing orders placed by the customer, a problem section noting any problems that the customer is having, and a potential order section describing potential orders to be placed by the customer.

"Level breaks" are provided at each division among members of a high level group appearing in a report. For example, consider a report shown in FIG. 23 listing customers, orders placed by the customers, and items in each order. The report is structured such that it first displays (beginning at the top of the report) all orders of the first customer. Within the display of each such order, there is displayed the items of the order. Each item may be displayed with information such as a price and/or a part number or relevant information needed by the report user. After all of the first customer's orders (and all items in those orders) have been displayed sequentially, a second customer is identified with attendant orders and items also listed. The division between the first customer and the second customer in the report constitutes a "level break." Further, each division between the individual orders under a given customer constitutes a level break. In the example of FIG. 23, both customers and orders constitute "high level" groups because their members (individual customers and orders) each contain information about lower level components, such as the items in an order. Generally, only such "high level" groups have level breaks. The divisions between members of the lowest level groups such as items are not deemed to constitute level breaks.

Level breaks are conveniently used in reports to present "totals" of the information pertaining to a particular high level entity. For example, first customer level break shown in FIG. 23 provides a total dollar volume of orders placed by that customer. Further under each order of that customer, a separate total number of items and total dollar value is provided.

The present invention enables a user to generate a report template for generating a spreadsheet report such as that illustrated in FIG. 23. The report template is generated from within a graphical user interface that resembles a spreadsheet report. In this manner, a user may easily generate a spreadsheet report in the desired format. In order to generate a spreadsheet report from the report template, the report may be generated and stored using report objects such as those disclosed in U.S. application Ser. No. 09/450,813, entitled "METHOD AND APPARATUS FOR GENERATING PAGE-LEVEL SECURITY IN A COMPUTER GENERATED REPORT," Rogers et al, and U.S. application Ser. No. 09/450,892, entitled "METHOD AND APPARATUS FOR CREATING AND DISPLAYING A TABLE OF CONTENT FOR A COMPUTER-GENERATED REPORT HAVING PAGE-LEVEL SECURITY," Rogers et al, which are incorporated herein by reference for all purposes.

FIG. 1 is a block diagram illustrating a system in which the present invention may be implemented. A spreadsheet designer 102 includes a banded range editor 104 that is capable of generating a report template 106. The report template 106 defines the format in which data will be presented in a spreadsheet report generated from the report template 106. An exemplary report template will be described in further detail below with reference to FIG. 4. Once the report template 106 has been generated, a server 108 obtains the report template 106 and obtains data from the appropriate data source 110 as referred to in the report template 106 to generate a spreadsheet report 112 (e.g., Excel document).

The report template 106 (and associated template formulas) may be implemented in the form of an object. An object may have inherent properties and operations based on a hierarchical relationship. Typically, a higher level class is defined broadly and then refined into to successively finer "subclasses." Each such subclass incorporates, or "inherits," all of the properties of its "superclass" and adds its own unique properties. The properties of the superclass need not be repeated in each subclass. Objects and object-oriented programming generally are described in many texts. One suitable introductory text is "Object-Oriented Modeling and Design" by Rumbaugh et al., Prentice-Hall, Inc., Englewood Cliffs, N.J., 1991 which is incorporated herein by reference for all purposes.

A "template object" is a persistently stored object containing many other objects and logical arrangements of those objects required to generate and display a given report. Thus, a template object may contain objects as described below, which may be used for representing a report template used for generating pages, frames, level breaks between records, etc., all for a single report. The template object may be stored in a compressed form on non-volatile memory such as a magnetic hard disk, a floppy disk, a CD ROM, etc. When the report template is to be displayed or otherwise accessed, at least part of the corresponding template object may be loaded into a volatile memory such as RAM for access by a computer CPU.

Figure 2:
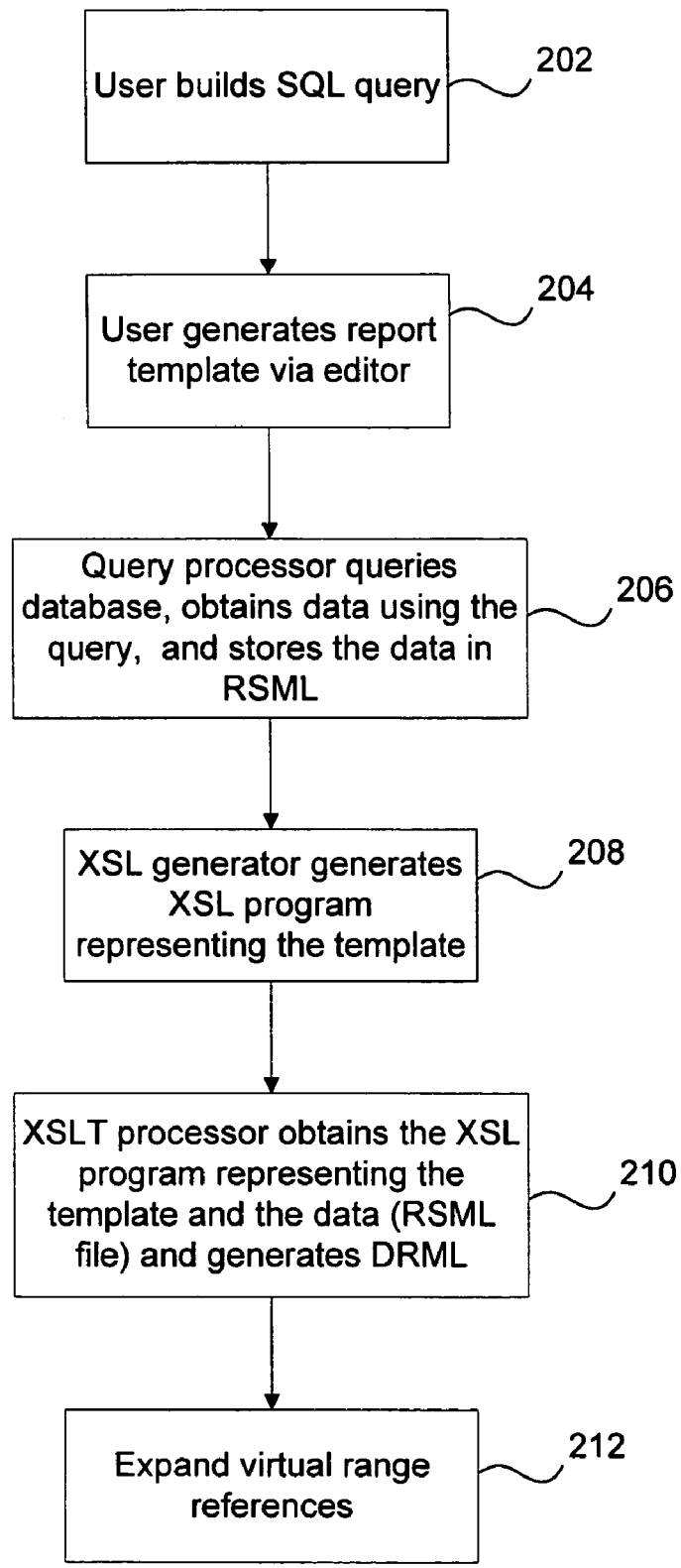
FIG. 2 is a process flow diagram illustrating a method of generating a report in a spreadsheet format such as Excel in accordance with various embodiments of the invention.

FIG. 2 is a process flow diagram illustrating a method of generating a report in a spreadsheet format such as Excel in accordance with various embodiments of the invention. As shown at block 202, the user builds a conventional SQL (Structured Query Language) query indicating the field names for which data is to be obtained. The query also indicates the manner in which the data is to be sorted. For instance, an example query is "select customerID, orderID, itemID from orders order by customer, order". The query may therefore indicate that data for order items is to be sorted by order, and each order is to be sorted by customer. The user then runs the editor 104 to design and generate a spreadsheet template at block 204. An exemplary spreadsheet template will be described in further detail below with reference to FIG. 4. In addition, independent of the spreadsheet template, a query processor queries the data source 110 (e.g., database) using the query to obtain the data to be used to generate the report at 206. The data is then stored in a conventional Result Set Markup Language (RSML) document. A XSL (Extensible Stylesheet Language) generator of the spreadsheet designer 102 then generates a XSL program in the standard XSL format representing the template at 208. A XSL processor takes the XSL program representing the template and the data (i.e., RSML) and generates a Data Range Markup Language (DRML) document at block 210. The DRML document includes virtual references which refer to one or more cells to which one or more attributes and/or formulas are to be applied. As will be described in further detail below with reference to FIG. 10, the DRML document includes modifications to the standard DRML document typically generated.

At block 212, these virtual references are "expanded." In other words, a "virtual" range reference having an associated formula and/or attributes (e.g., formatting) to be applied is expanded to refer to the specific cell and/or region reference(s) that will exist once the data is obtained. Specifically, a cell reference typically refers to the location of a cell or a range of cells in a spreadsheet, such as by letter and number (e.g., A5). While a "cell" reference refers to a single location, a "range" reference refers to a contiguous set of cells (e.g., A5:A8). This expansion process will be described in further detail below. In this manner, the user may generate a report by applying the report template to the data. Accordingly, through the use of the present invention, a report may be generated such that the user can format and run a report from within the spreadsheet user interface.

As described above, a virtual reference is a reference to one or more "virtual" cells within a spreadsheet to which a formula and/or attributes (e.g., cell formatting such as color, font) are to be applied. The formula and/or attributes are therefore mapped to the cells within the appropriate group. In this manner, a formula and/or attributes may be applied to an indeterminate number of cells.

FIG. 3 is a diagram illustrating exemplary data obtained from a database. As shown in this example, the data obtained from the database corresponds to two different customers, represented numerically by "01" and "02." Each customer has two different orders, each order consisting of two items. For each order item, the price and quantity are illustrated in the corresponding row.

As described above, a report template defines the format in which data will be presented in the spreadsheet report generated from the report template. FIG. 4 is a diagram illustrating an exemplary report template including multiple groups and virtual references (@E3) that is generated in accordance with various embodiments of the invention. As shown, the template designed by the user includes multiple group levels customer and order, and identifies fields customer, order, price, and quantity. Each cell of a template may include one or more attributes (e.g., formatting, grouping) and/or one or more formulas (including one or more field or cell references). A formula may include a single field or cell reference as well as a more complex formula. Formatting of cells (and rows) may include color, fonts, such as bold type of the customer field, as shown. Other types of formatting include control, conditional formats, outlining or borders. A "control" is a feature of a report's frame or page that presents information other than the tabular or sequential data that typically is presented for comparison in a report. Examples of controls that might be included on a page of a report include static text, text streams from a database, integers, bitmaps, graphics of various types, charts and multimedia output. Such controls can be used to display, for example, page numbers, titles, footnotes, and information about a specific entity described in the report.

In this example, the darker row represented in cell E3 is a standard Excel reference. The lighter shaded rows represented by cells E4 and E5 illustrate virtual references. Specifically, in this example, each virtual reference "@E3" indicates that a separate formula (e.g., sum) is to be computed in association with the designated group(s) (e.g., customer, order) for items represented by the formula (e.g., C3*D3) in the specified cell (e.g., E3). In other words, through the use of a template, the grouping selected via the graphical user interface is tied to the formulas as well as the formatting within a template. In this example, the sum of the formula C3*D3 is to be calculated for the order group as well as the customer group, resulting in multiple sub-totals. It is also important to note that the grouping of the customer and order headers may indicate the manner and placement of display of those groups and associated information. The resulting report template persists between retrieving new data from a database, and therefore may be reused for various database queries.

FIG. 5 is a diagram illustrating an exemplary report template in which the unqualified virtual references of FIG. 4 have been expanded in accordance with various embodiments of the invention. An unqualified virtual reference such as "@E3" as shown in FIG. 4 is a virtual reference that is not qualified by a group (e.g., customer). When unqualified virtual cell references are cut and pasted within the grid, they remain unqualified. As described above, the virtual references shown in the light shaded areas of FIG. 4 are expanded as shown in the light shaded areas of FIG. 5. In other words, the virtual reference "@E3" shown at E4 and E5 of FIG. 4 are each expanded to refer to the specific cell and/or region reference(s) that will exist once the data is obtained. These specific references and associated formula are then "placed" in the cell(s) for the group (e.g., customer, order, or order item) to which the associated formula (and/or attributes) is to be applied after the data has been obtained. For instance, as shown at cell E5 of FIG. 5, the virtual reference "@E3" has been expanded to the region reference E3:E4, which is placed in cell E5 corresponding to the group "order" for which the sum is to be calculated after the data has been obtained. In this example, the first customer has a subtotal associated with each order, as well as a total for the first customer (both orders combined). Similarly, the second customer has a subtotal associated with each order, as well as a total for the second customer (both orders combined).

FIG. 6 is a diagram illustrating an exemplary report template in which the group of cells referenced by the virtual reference is qualified but not expanded in accordance with various embodiments of the invention. An exemplary qualified virtual reference is "@cust!F5." The exclamation mark qualifies (i.e., designates) the group (e.g., customer) being referenced, followed by the cell reference (e.g., F5). The "@" symbol indicates that the reference "F3/@cust!F5" is a formula including a virtual reference "@cust!F5" to be expanded.

FIG. 7 is a diagram illustrating an exemplary report template in which the qualified virtual reference of FIG. 6 has been expanded in accordance with various embodiments of the invention. The expanded virtual references are illustrated in cells E3, E4, E7, E8, E13, E4, E17, and E18. For instance, the reference to specific cells "F4/F10" is placed in cell E4, which is to exist after the data has been obtained. In addition, the unqualified virtual reference of FIG. 6 (@E3) is also expanded, as shown in the lightly shaded cells in column F.

Figure 8A:
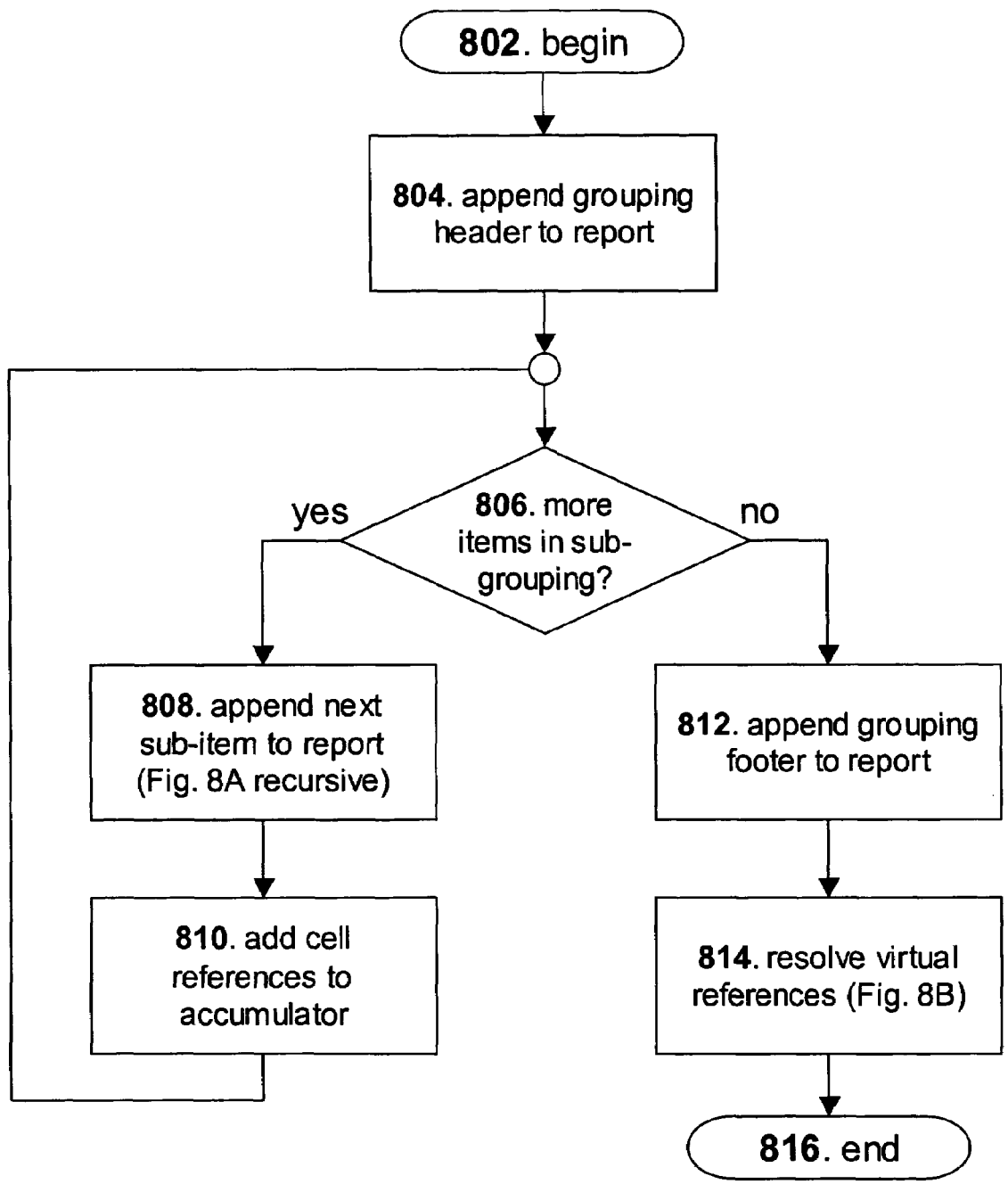
FIGS. 8A and 8B are process flow diagrams that together illustrate a method of expanding virtual references in accordance with various embodiments of the invention.
Figure 8B:
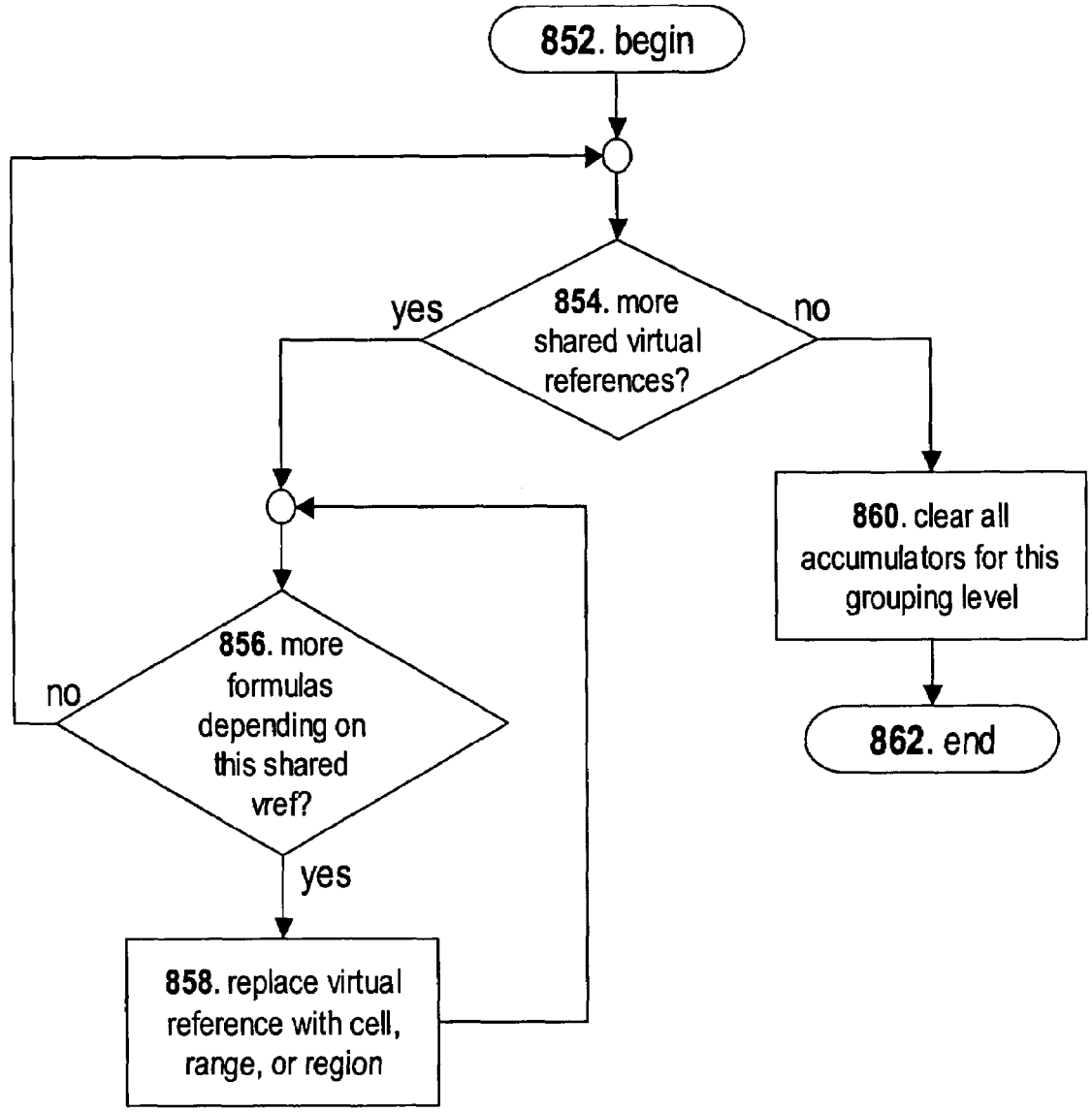

FIGS. 8A and 8B are process flow diagrams illustrating a method of expanding virtual references in accordance with various embodiments of the invention. As described above with reference to FIG. 2, expansion is preferably performed from a DRML file during generation of a report from the report template. An exemplary DRML file will be described in further detail below with reference to FIG. 11. As shown in FIG. 8A, the process begins at step 802 and when a new grouping tag is identified in the DRML file, a grouping header is appended to the report (e.g., report object) at block 804. If at step 806 it is determined that there are more detail row items (e.g., cells or sub-groups) in the grouping, the process repeats at block 808 recursively to append the next sub-item to the report and repeat the method of FIG. 8A for further sub-groups.

During this process, data (e.g., values, formulas, or virtual references) are stored in the appropriate cells of the spreadsheet report as the DRML file is parsed. Specifically, the cell locations for the data are determined by row and cell tags within the DRML file. In addition, cell tags are used to designate the data that is to be placed into cells of the spreadsheet. At the same time, virtual references are tracked through the use of "accumulators." In accordance with one embodiment, accumulators are created or instantiated for each instance of a grouping level (e.g., for the first customer or first customer order). The accumulators maintain a set of references that will ultimately replace the virtual references. For instance, an accumulator may be identified with a specific virtual reference. Upon completion of parsing of the DRML file for that instance of the grouping level (e.g., the first customer), the contents of the accumulator for the virtual reference are then used to replace the virtual reference that has been placed in a cell of the spreadsheet report (or corresponding data structures).

Although a user may enter a qualified or unqualified virtual reference into the spreadsheet user interface, the virtual reference is stored internally as a "qualified" reference. In other words, the grouping level is associated with the virtual reference. Thus, when the DRML file is generated, the grouping level may also specified in the DRML file as a "group tag" that precedes the virtual reference.

As shown in block 810, one or more virtual references associated with that particular grouping level (e.g., following the group tag in the DRML file) are tracked by "accumulators." In accordance with one embodiment, an accumulator corresponds to a virtual name (e.g., name tag) associated with a virtual reference. For instance, the virtual name may be equal to the virtual reference (e.g., E3). Using this accumulator, the accumulator maintains a list of actual cell references that will eventually replace the virtual reference. This collection of cell references (e.g., cell names/grid locations) may subsequently be used to replace a virtual reference, as will be described in further detail below with reference to FIG. 8B. Since the contents of all cells corresponding to detail rows within a particular grouping or sub-grouping are stored in the spreadsheet report, the contents of each of these detail rows may also include one or more virtual references. The virtual reference will therefore be replaced via the appropriate accumulator when parsing of that particular instance of the grouping level (e.g., first order of customer 1) has been completed. The accumulator may use an array, inked list, or other suitable data structure to store the cell references. In this manner, references to multiple detail rows may be added to an accumulator in association with a virtual reference for a particular grouping level (e.g., customer). In other words, these collections of cell references (e.g., E3, F5, D4) are accumulated for all grouping levels (for each instance of those grouping levels) as the DRML file is parsed. Once an instance of a grouping level is completed, a grouping footer may be appended to the report at block 812 and the virtual references for that grouping level (e.g., included in a grouping footer) are resolved at block 814, as described above. In other words, a row may be added to the spreadsheet report. A grouping footer is a detail row item associated with a particular grouping, which is to be provided in the spreadsheet report for that particular grouping. The grouping footer may, for example, be a sub-total for an order or customer grouping. Thus, the grouping footer may include a virtual reference. The virtual reference placed in a cell of the report will subsequently be replaced when parsing of that grouping level is completed.

Block 814 of FIG. 8A is described in further detail in FIG. 8B. The process begins at block 852. Block 854 represents a loop through all virtual references for the current grouping level (e.g., tracked by the accumulators for that grouping level instance), and block 856 represents a loop through all formulas that use a virtual reference (tracked by a data structure such as a linked list). At block 858 the virtual reference in a specific formula previously placed in a cell of the spreadsheet report data structure is replaced with a cell, range, or region reference. For instance, the cell, range, or region reference may be obtained from the accumulator associated with that virtual reference (e.g., associated with the virtual name). When all virtual references for the grouping level are completed (i.e., expanded), the accumulators for the grouping level are cleared at block 860 in preparation for the next instance of a grouping level (e.g., the next customer). In other words, since all virtual references for that instance of a grouping level (e.g., the first customer) have been expanded, those expanded references have been replaced in the spreadsheet report data structure and therefore the contents of the accumulators for that grouping level may be cleared. The anatomy of a virtual reference will be described in further detail below with reference to FIG. 9.

As will be described in further detail below, this replacement process may be performed in various orders. For instance, the replacement process may be performed in a top-down manner in the order in which the formulas are used and found within the spreadsheet template. In addition, the replacement process may be performed in a top-down manner within a particular group (e.g., customer, order). Alternatively, the replacement process may be performed in a round-robin fashion between different groups.

It is also important to note that virtual references may be "fixed up" (adjusted) when the relative position of the virtual reference and the cells referenced changes. This normally occurs when rows and columns are inserted or deleted. Virtual references may also be corrected when report ranges (e.g., templates) and report bands (e.g., headers) are renamed. In other words, the virtual reference may be associated with a different group. Fixup is accomplished by adding or deleting columns or rows to the virtual reference to accommodate for the insertion or deletion of row(s) and/or column(s). For instance, for a virtual reference "@E5" the deletion of a column may result in fixup of the virtual reference to "@D5." Similarly, for the virtual reference "@E5" the insertion of a row may result in fixup of the virtual reference "@E5" to "@E6."

Figure 9:
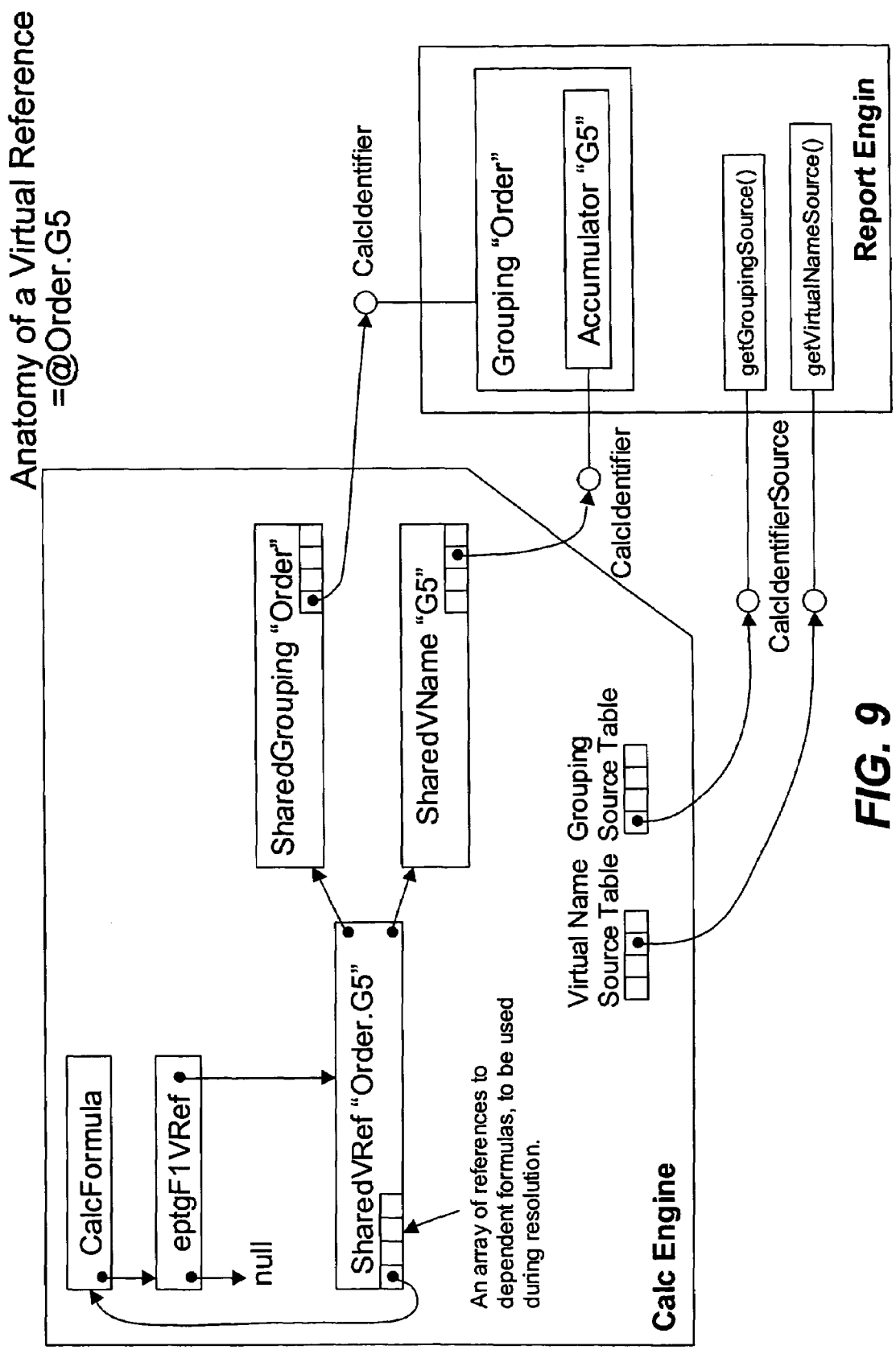
FIG. 9 is a diagram illustrating a virtual reference object and associated data structures that enable a reporting engine to expand the virtual references as shown in FIG. 8B in accordance with various embodiments of the invention.

In order to expand a virtual reference, the virtual reference is first obtained. Various data structures may be used to store and maintain virtual references as well as to store and maintain associated expanded actual cell and/or range references. In addition, various class hierarchies may be implemented to enable instantiation of virtual references that are implemented in an object-oriented language. FIG. 9 is a diagram illustrating a virtual reference object and associated data structures that enable a report engine to expand the virtual references as shown in FIG. 8B in accordance with various embodiments of the invention. Multiple formulas within a spreadsheet template may include the same virtual reference. As a result, it is possible to "reuse" a shared virtual reference that is shared by multiple formulas. For instance, as shown in FIG. 9, a formula includes a virtual reference "Order.G5" shared by multiple formulas within a spreadsheet template. The virtual reference is identified by a grouping "Order" and a cell name "G5." As shown, an array, linked list, or other suitable data structure may be used for tracking dependent formulas, which may be used by the report engine during resolution/expansion of the virtual reference. A "dependent formula" is a formula that "accesses" or "includes" the virtual reference. For instance, SUM(@Order.G5)/SUM(@Cust.H6) is a formula that is dependent upon two different virtual references, @Order.G5 and @Cust.H6. Since it will be necessary to resolve each of these virtual references before the sum can be computed, the formula is referred to as "dependent" upon these virtual references.

Figure 10:
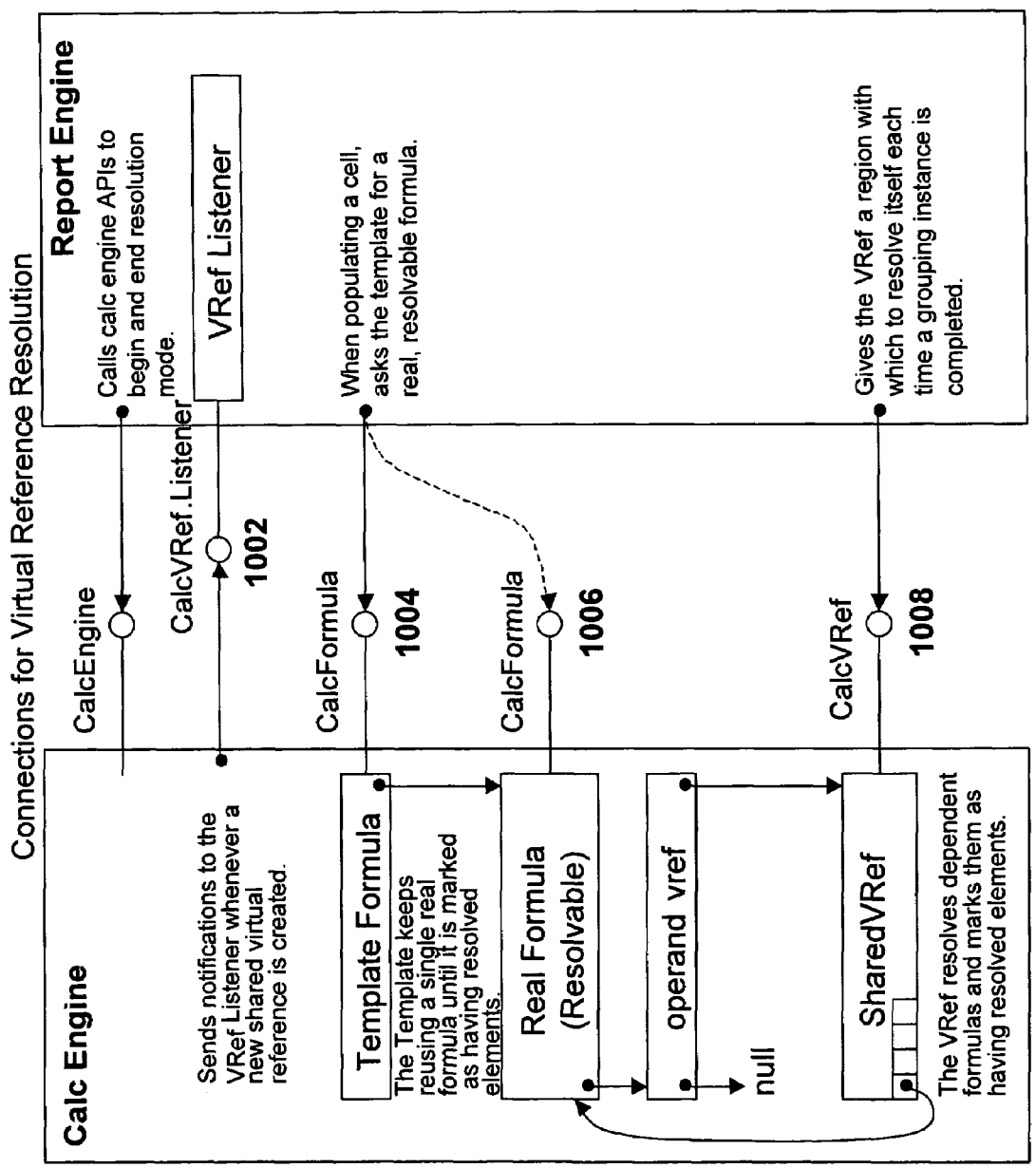
FIG. 10 is a diagram illustrating the relationships between the report engine, which is responsible for producing a report from the report template, and the calculation engine, which is responsible for maintaining formulas in accordance with various embodiments of the invention.

As described above with reference to FIG. 2, a DRML document is generated from the spreadsheet template and the data, which includes virtual references which refer to one or more cells to which one or more attributes and/or formulas are to be applied. FIG. 10 is a diagram illustrating the relationships between the report engine, which is responsible for producing the report, and the calculation engine, which is responsible for maintaining formulas. The report engine instantiates accumulators according to grouping properties in the DRML document. Thus, accumulators may be used to maintain a collection of cell references (e.g., cell names) that will eventually replace virtual references for each grouping level as the DRML file is parsed. Specifically, cell names are comprised of cell rows and cell columns (e.g., E4). Thus, the cell row is ascertained conventionally via a row tag. The cell column is identified via the number of cell tags that have been parsed within the DRML file after a row tag has been parsed. Alternatively, a cell name is ascertained via a virtual name (i.e., name tag) in association with a formula. As shown at connection 1002, the report engine receives notification of new virtual references as the dependent formulas are added to the report. This enables the report engine to track those virtual references, which will be later replaced with actual references via the appropriate accumulators. In order to expand a virtual reference, the report engine determines to which grouping level the virtual reference belongs, and with which accumulator it is associated. Specifically, the report engine may parse the DRML file to ascertain the grouping order as well as cell name (or receive this parsed information) in order to proceed with expansion of the virtual reference. This expansion process will be described in further detail below with reference to FIGS. 13A and 13B.

FIG. 11 is a diagram illustrating an exemplary DRML language file in which groups are labeled in accordance with one embodiment of the invention. As shown, groupings such as customer 1102 and order 1104 are tagged within the DRML file to identify to which groups the data (e.g., row items) is associated. In this example, the customer 1102 and order 1104 that are identified are in association with the first row (first item) of the first order. Moreover, row tags 1008 and cell tags 1010 are used to ascertain the appropriate cell location of the spreadsheet report in which the data is to be placed. In this example, a "begin group" tag is used to enable an accumulator to track the groups associated with a virtual cell reference. In addition, the name of the virtual cell 1106 is also identified. The name (e.g., E3) includes a column identifier (e.g., E) as well as a row identifier (e.g., 3). An "end group" tag may be used to indicate the end of a particular group. Through parsing this information, the accumulator may obtain information in order to instantiate and track objects for expansion of the virtual references. Various exemplary diagrams will be used to illustrate the expansion process in the following description.

FIGS. 12A and 12B are diagrams illustrating an exemplary report template including a formula with a virtual reference before and after expansion of that virtual reference. Specifically, FIG. 12A includes a template formula as shown in cell F6. The template formula includes two different virtual references, @Order.G5 and @Cust.H6. The spreadsheet report template as reflected in the DRML file is resolved in sequential order, such that the formulas are resolved in sequential order as the virtual references are expanded corresponding to the data in the DRML file.

Using the data and the report template, the template formula is resolved for each instance in which it occurs. In one embodiment, resolvable instances are generated (e.g., instantiated) as appropriate. A resolvable instance of the template formula may therefore be defined as an instantiation of the template formula prior to determination of the specific cell and/or region references replacing the virtual references. Each resolvable instance of the formula is then resolved.

Specifically, as shown in FIG. 12B, three separate resolvable instances of the template formula are generated and resolved in association with cells F7, F11, and F14, corresponding to a first customer with one order, and a second customer with two orders, respectively. In order to resolve each resolvable instance, the actual cell references (i.e., cell names) that will replace the virtual reference are stored in accumulators as the report is produced. When an instance of a grouping level is completed, the virtual references for that grouping level are replaced by the actual cell, range, or region references obtained from the corresponding accumulator. In other words, as described above, the names/locations of the cell, ranges, or regions were previously recursively stored in the accumulator(s) as all rows of a particular grouping level of the DRML file were parsed. During resolution of virtual references within an instance of a particular group, the contents of the appropriate accumulator are obtained and used to replace the associated virtual reference (e.g., identified by its virtual name). In this manner, the virtual references tracked in a linked list or other data structure may be replaced by the specific cell or region references obtained from the corresponding accumulator(s). The use of #NULL! (as shown in cell F11) rather than a specific cell reference indicates that the virtual reference resolved to an empty set of cells.

Figure 13B:
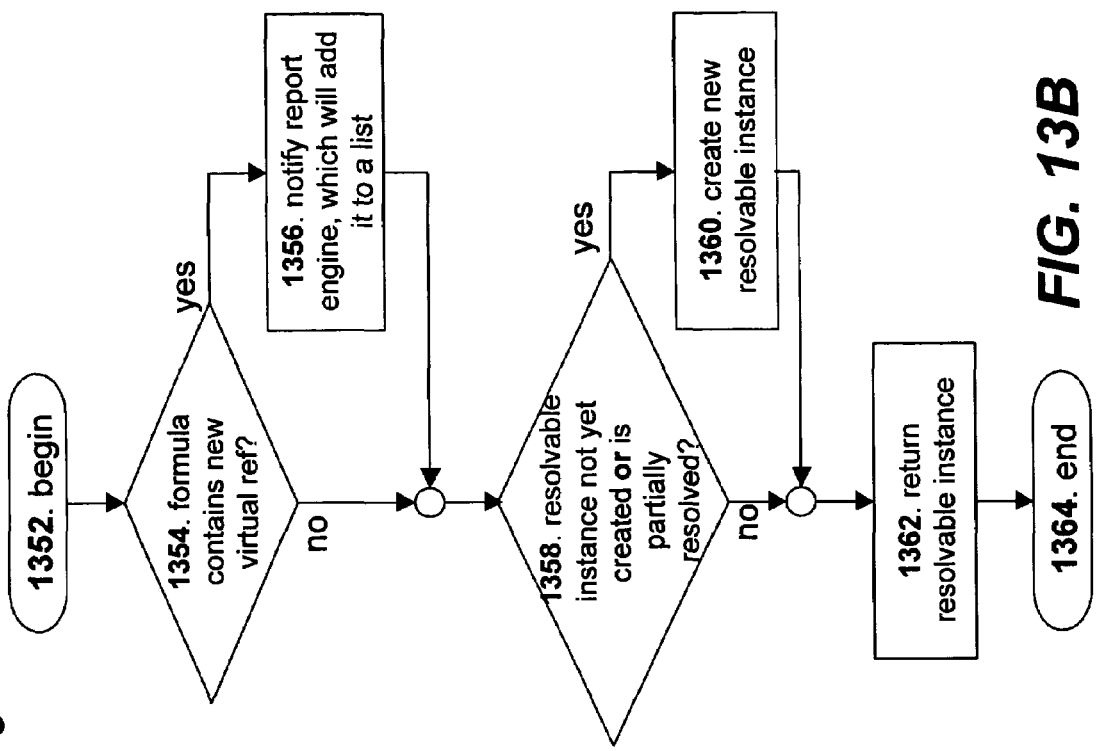
FIGS. 13A and 13B are process flow diagrams illustrating a method of tracking cells and virtual references such that the virtual reference resolution illustrated in FIG. 8B is possible in accordance with various embodiments of the invention.
Figure 13A:
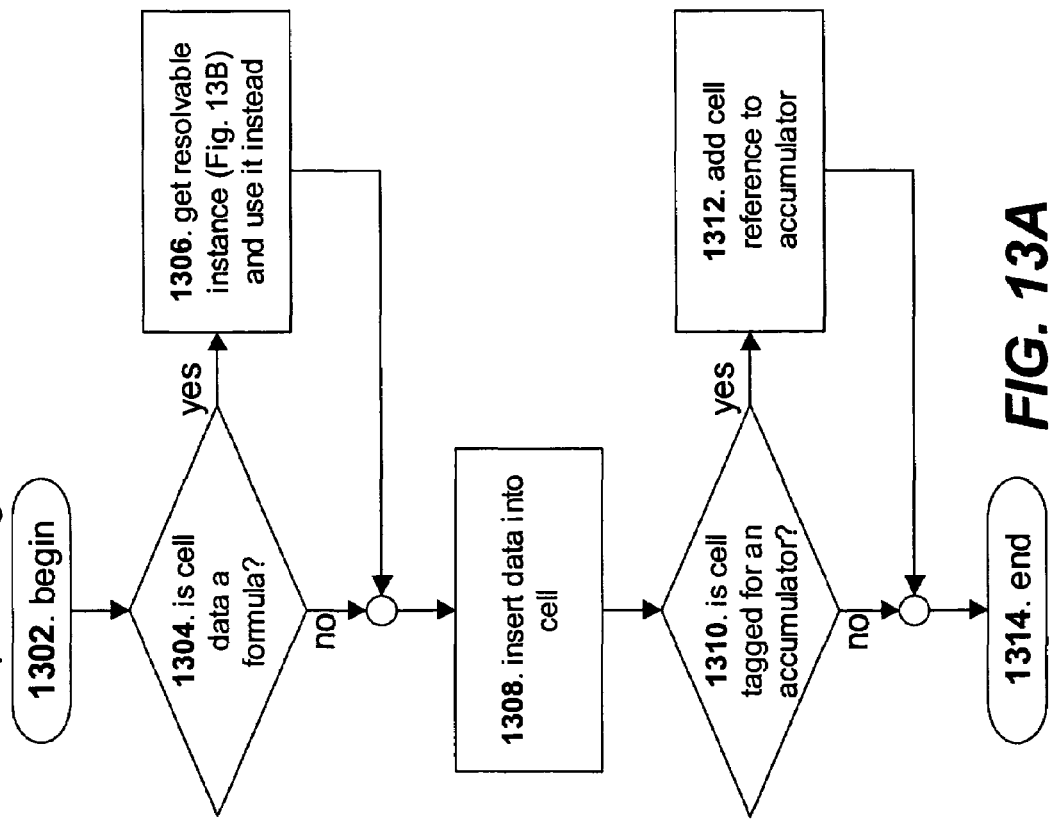

FIGS. 13A and 13B are process flow diagrams illustrating a method of tracking cells and virtual references such that the virtual reference resolution illustrated in FIG. 8B is possible. As shown in FIG. 13A, the process begins at block 1302 and continues as the DRML file is parsed. If the cell data in the DRML file is determined to be a formula at block 1304, a copy (or instance) of the template formula is generated at block 1306 and is associated with a specific cell at block 1308, corresponding to the expected placement of the data (e.g., its cell location determined by row and cell tags in the DRML file, or name tag associated with a formula). The template formula is parsed by the calculation engine at the time it is retrieved from the DRML document; the template formula and the resolvable instance of the template formula are provided by the calculation engine via connections 1004 and 1006 of FIG. 10, respectively. If the cell in the DRML file is tagged with a name (e.g., virtual name) at block 1310, a reference to that cell location in the spreadsheet as ascertained from the row and cell tags (e.g., A4) is added to the corresponding accumulator at block 1312 and the contents of that cell (e.g., formula including the virtual reference) are stored in the appropriate cell of the spreadsheet report data structure. The process is complete at block 1314.

FIG. 13B shows the process by which the calculation engine provides a resolvable instance of a template formula. When a new virtual reference is detected at block 1354 in a template formula, the calculation engine notifies the report engine at block 1356, via the connection 1002 of FIG. 10. A new resolvable instance is created as shown at blocks 1358-1360 for each virtual reference that has not been resolved. When the reporting engine is notified of the shared virtual reference, it associates the virtual reference with the appropriate accumulator.

Figure 14:
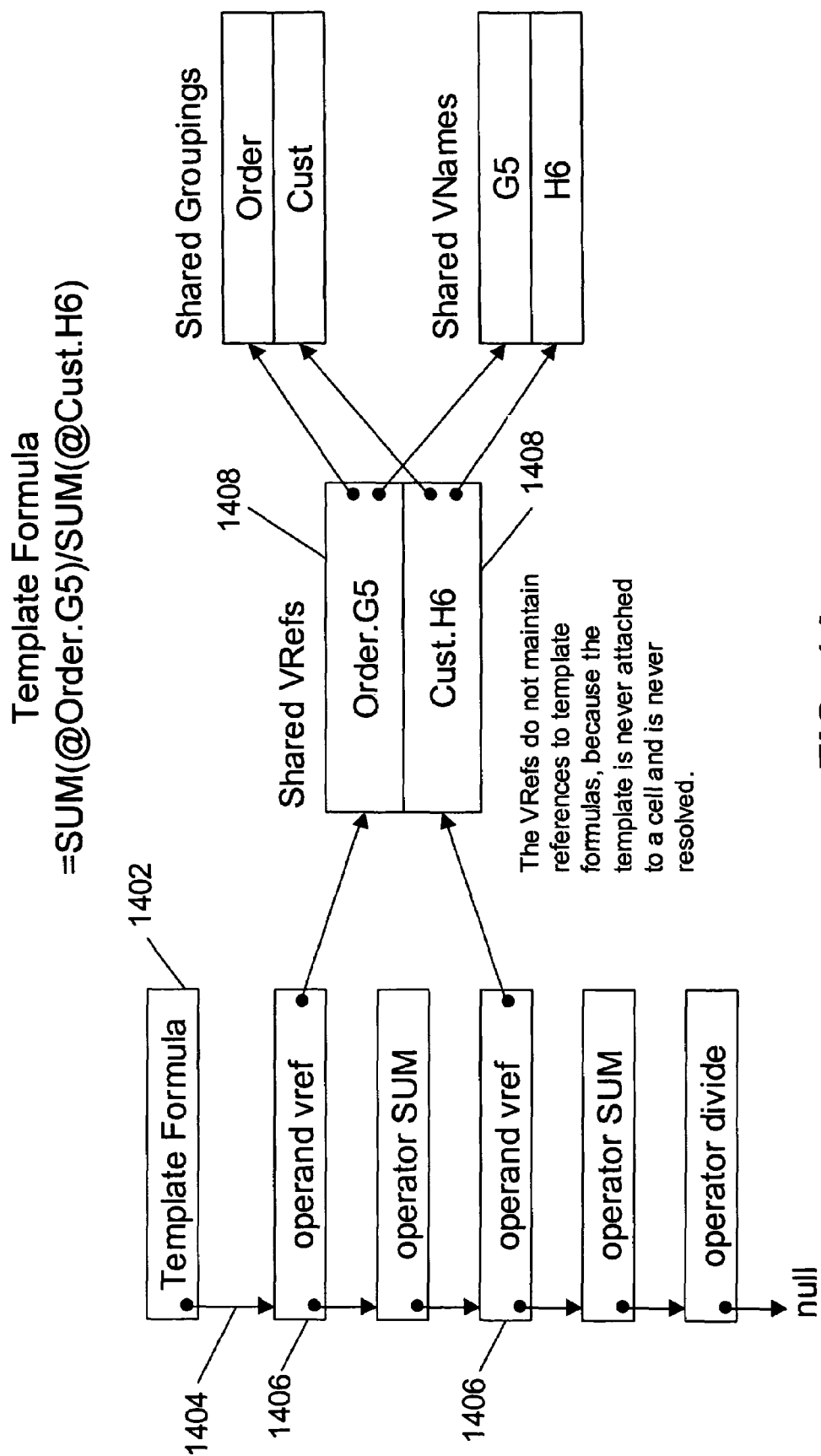
FIG. 14 is a diagram illustrating a data structure used to store a template formula and associated virtual reference in accordance with one embodiment of the invention.

FIG. 14 is a diagram illustrating a data structure used to store a template formula and associated virtual reference in accordance with one embodiment of the invention. As shown, the template formula 1402 has an associated linked list 1404 including one or more formula tokens in postfix order representing the parsed template formula 1402. The virtual reference operands 1406 each reference a virtual reference 1408.

Figure 15:
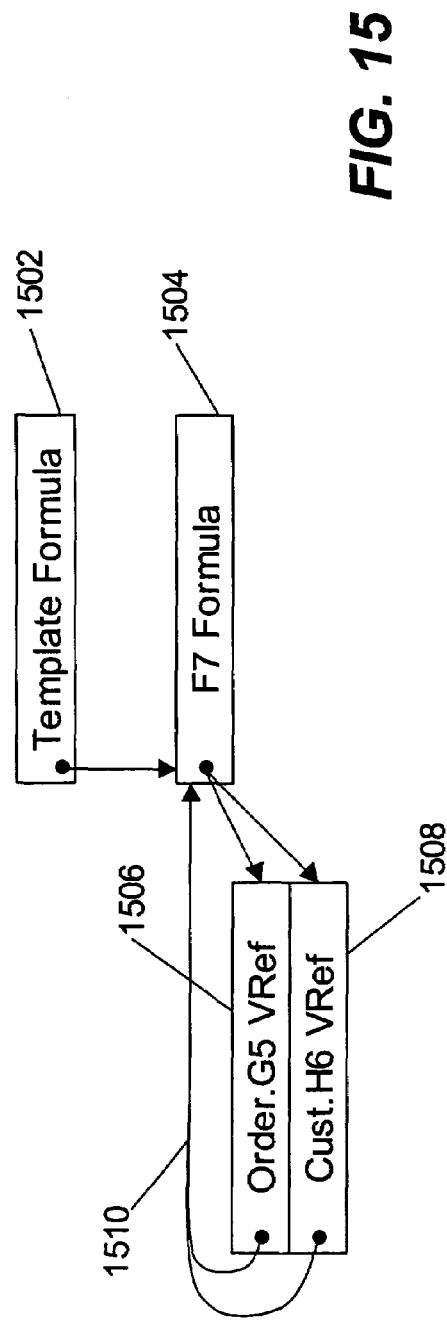
FIG. 15 provides a succinct illustration of the relationship between the template formula, resolvable instance, and shared virtual references for an unresolved formula in accordance with one embodiment of the invention.

FIG. 15 provides a succinct illustration of the relationship between the template formula 1502, resolvable instance 1504, and shared virtual references 1506 and 1508, for an unresolved formula in the spreadsheet template—in this case, the formula at cell F7. This resolvable instance includes two virtual references, Order.G5 and Cust.H6. In this example, the two virtual references point to or refer back to the resolvable instance. Thus, when one of these virtual references has been resolved, it may be determined which formula it is associated with. As shown in the associated spreadsheet template, a user guide at the right of the template indicates whether a row is associated with a [C]ustomer group, [O]rder group, or [I]tem group.

The template formula and resolvable instance each have a linked list of formula tokens as shown at 1404 of FIG. 14; the tokens are omitted from FIG. 15 for conciseness. The resolvable instance's references to the shared virtual references are not actually direct; they are through the vref tokens as shown at blocks 1406 of FIG. 14.

The shared virtual references 1506 and 1508 maintain references to the dependent formula 1504, as shown at 1510. As will be demonstrated later, the shared virtual reference may have multiple dependent formulas. When the reporting engine has determined which cell, range, or region reference will replace a shared virtual reference, it provides that information (e.g., the cell range or region reference) to the shared virtual reference via the connection 1008 of FIG. 10 (e.g., to the appropriate method of that shared virtual reference). Specifically, the reporting engine determines which cell, range, or region reference(s) will replace the shared virtual reference from the accumulator(s), which the reporting engine manages. The shared virtual reference then loops through its list of dependent formulas and replaces itself with a cell, range, or region reference in each one of the formulas. Having done so, it clears its list of dependent formulas.

Figure 16:
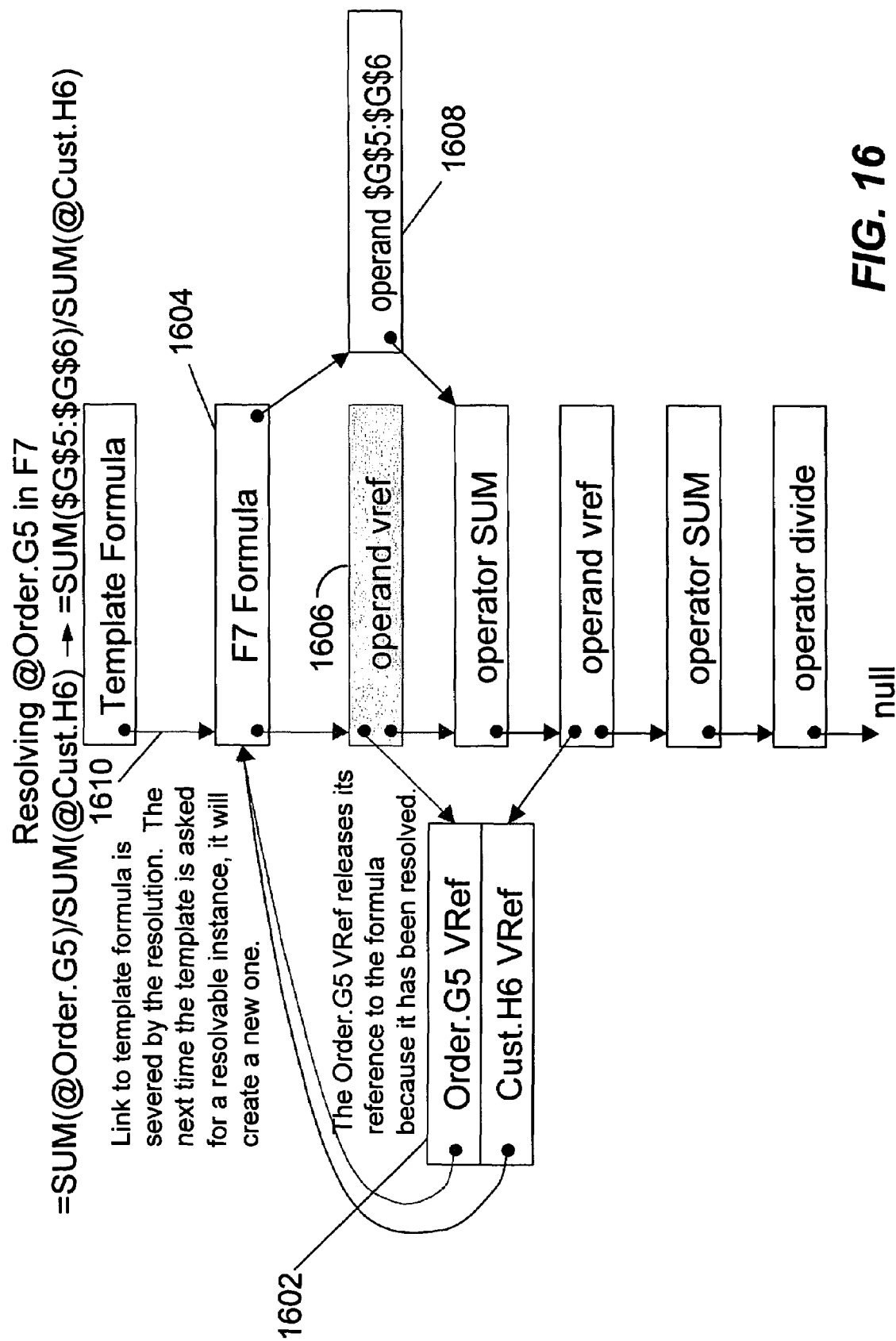
FIG. 16 is a diagram illustrating the conversion of an unresolved virtual reference into a specific cell or range reference in accordance with various embodiments of the invention.

FIG. 16 is a diagram illustrating the conversion of an unresolved virtual reference into a range reference. In this diagram, objects and references that existed only before the resolution of the virtual reference are shown in gray. When the shared virtual reference @Order.G5 is resolved, the shared virtual reference 1602 is given a collection of one or more cell or range references. Through its reference to the resolvable instance 1604, the shared virtual reference accesses the token list and replaces the vref operand 1606 with a range operand 1608. Specifically, the range operand 1608 a range reference, as shown, indicating actual locations of one or more cells. This range reference that is used to replace the vref operand 1606 is obtained from the corresponding accumulator, as described above. Once a virtual reference in the resolvable instance has been resolved, the template formula's link to the resolvable instance, 1610 in this diagram, is no longer valid, and this resolvable instance will not be reused for new cells.

Figure 17:
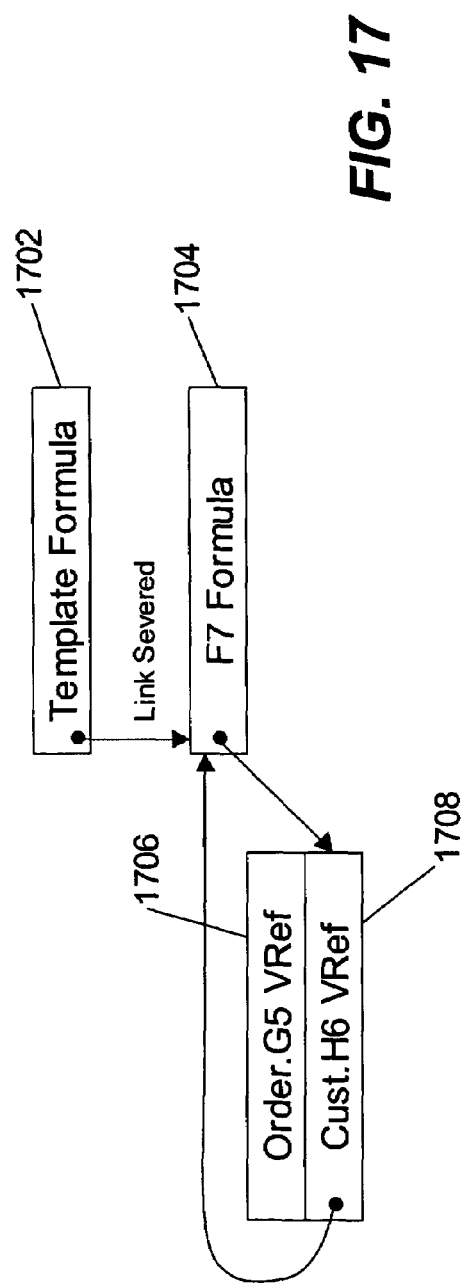
FIG. 17 is an exemplary diagram illustrating in succinct fashion the new state of a template formula, resolvable instance, and shared virtual references when one out of two virtual references in the formula have been resolved.

FIG. 17 is a diagram illustrating in succinct fashion the new state of the template formula 1702, resolvable instance 1704, and shared virtual reference 1706. The resolvable instance of the template formula and the shared virtual reference 1708 still share references to each other, because that virtual reference has not yet been resolved.

As shown in cell F7, the absolute cell reference $G$G and $G$6 are provided in resolution of the first virtual reference. Specifically, a cell reference points to an exact location in a worksheet. When a spreadsheet cell containing an absolute reference (designated by the "$" symbol) is moved or copied, it always continues to refer to the originally referenced cells. In contrast, a relative cell reference such as H6 points to a cell position relative to the current cell. In other words, when the relative cell reference is copied, it no longer refers to the originally referenced cells.

FIG. 18 is a diagram illustrating the use of the data structure of FIG. 15 after complete expansion of a virtual reference such as the virtual reference of FIG. 12A for the first customer. As shown, when all virtual references in the formula have been resolved, there are no longer any links between the resolvable instance (now a fully resolved formula) and the template formula or shared virtual references.

Figure 19:
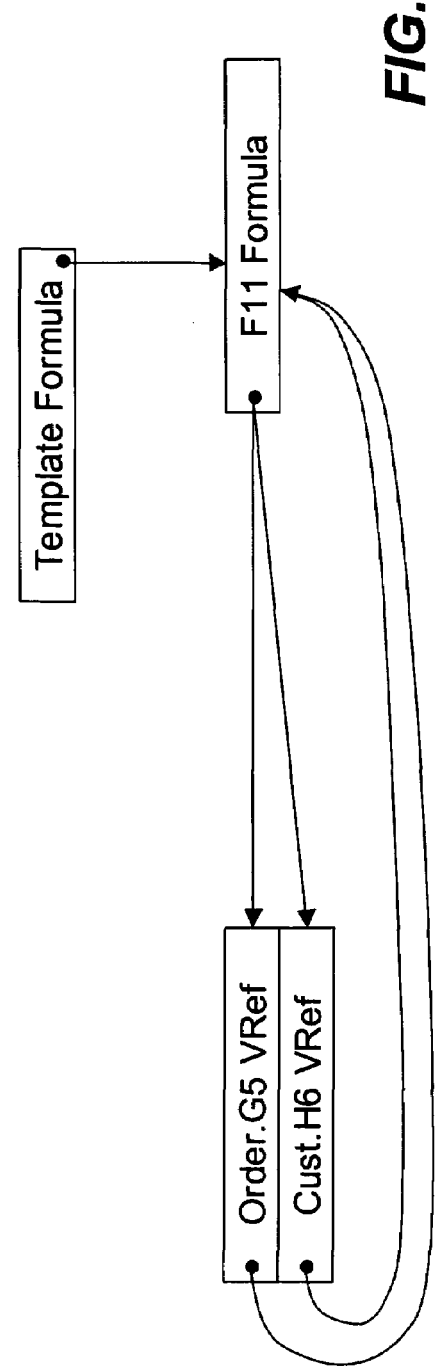
FIG. 19 is a diagram illustrating the use of the data structure of FIG. 13 to expand the virtual reference of FIG. 12A for the first order for the second customer.

FIG. 19 is a diagram illustrating the use of the data structure of FIG. 15 to expand the first virtual reference of FIG. 12A for the first order for the second customer. As shown in this example, the formula has been resolved for the first customer. However, the formula remains unresolved for the second customer. In this example, as shown in FIG. 12B, there are two orders for the second customer, but there are no detail items for the first order.

Figure 20:
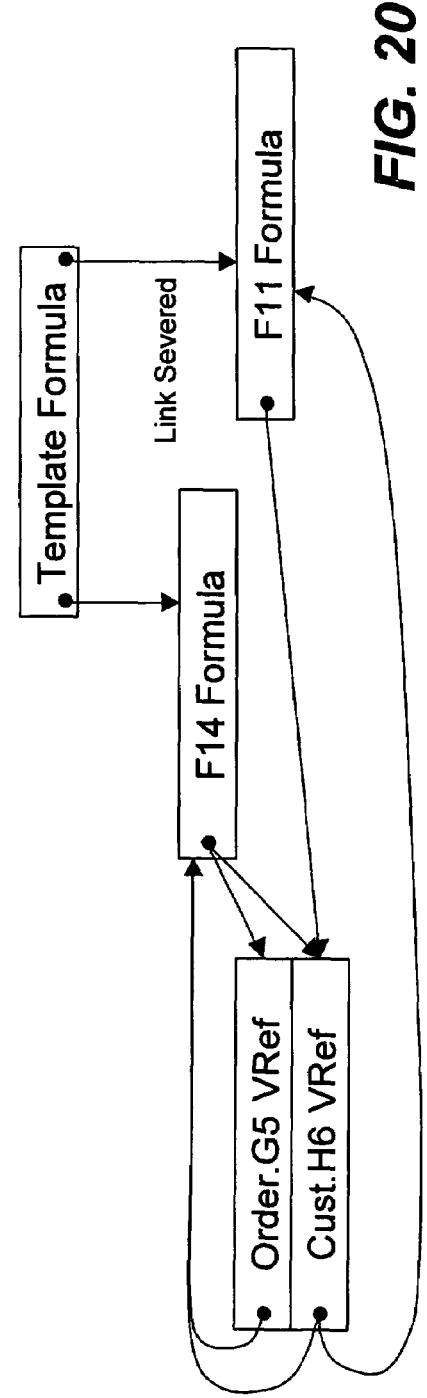
FIG. 20 is a diagram illustrating the use of the data structure of FIG. 15 to expand the first virtual reference of FIG. 12A for the second order for the second customer.

FIG. 20 is a diagram illustrating the use of the data structure of FIG. 15 to expand the first virtual reference of FIG. 12A for the second order for the second customer. As shown, #NULL! is used to indicate that there are no detail items (e.g., customer with no orders, or order including no order items) for a function such as COUNT( ) to ensure that the count will be equal to zero for that particular order. The resolution process is then performed for the second order, as described above.

Figure 21:
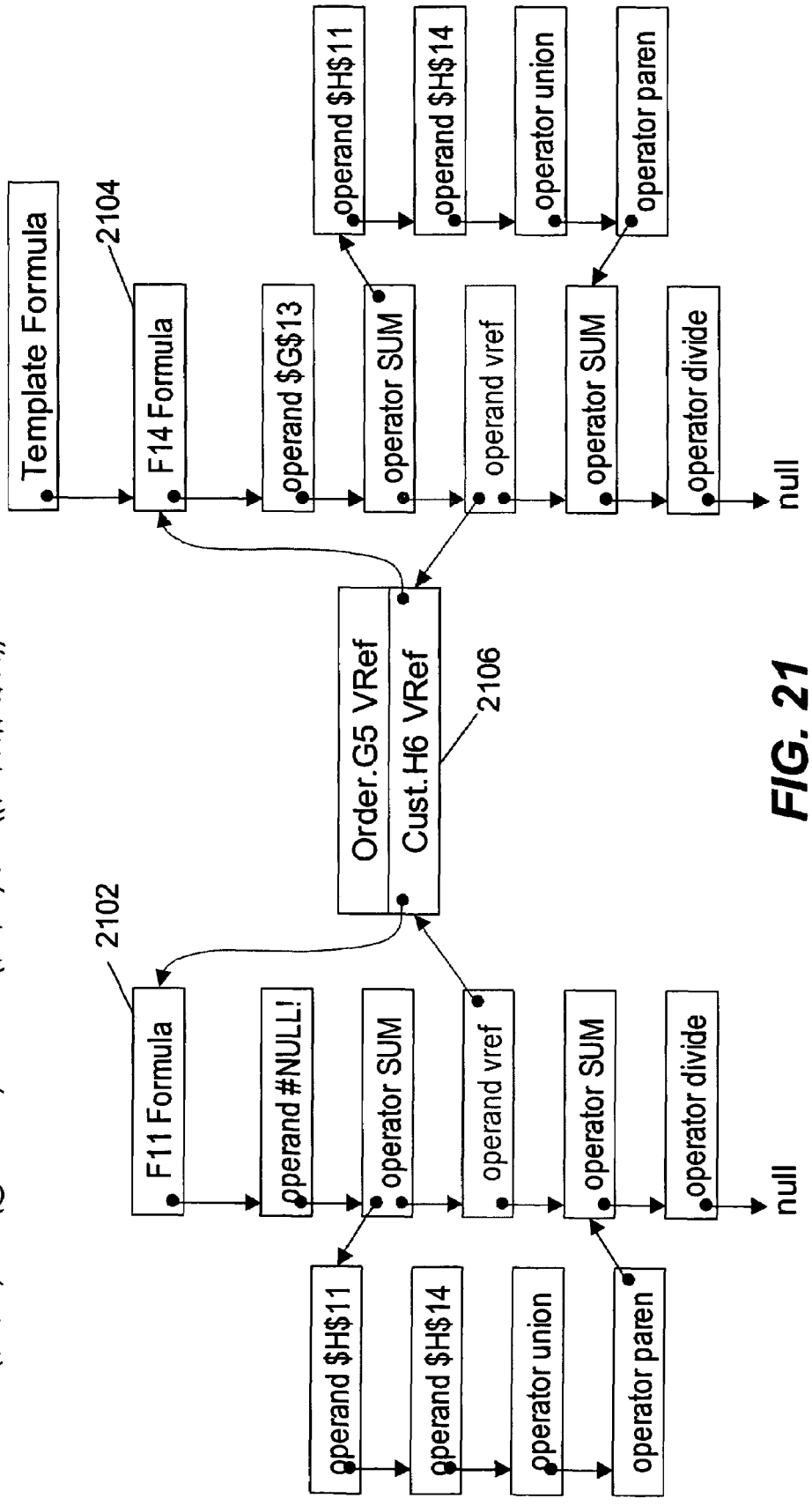
FIG. 21 is an exemplary diagram illustrating the conversion of an unresolved virtual reference into a specific cell or region reference, where there are two dependent formulas.

FIG. 21 is a diagram illustrating the conversion of an unresolved virtual reference into a region reference. In this example, there are two dependent formulas 2102 and 2104. The shared virtual reference 2106 has maintained references to both of these formulas, and resolves both of them. This example also demonstrates that it is possible to replace a single virtual reference token with multiple tokens, provided that those tokens evaluate to a set of cells or an error condition.

FIG. 22 is a diagram illustrating the report template after complete expansion of the virtual reference of FIG. 12A for both customers. Specifically, all three instances of the template formula have been resolved such that the virtual references are replaced by specific cell references. Thus, when the template report is used to generate the spreadsheet report, the sums are calculated and placed in the specific cell references.

Through the use of the present invention, formatting may be repeated within a spreadsheet report corresponding to the grouping defined in a report template. In addition, the report template enables formulas within the report template such as subtotals to be repeatedly calculated during spreadsheet report generation. For instance, a header band may be used to identify and separate information for each customer. In this manner, multiple rows of orders and sub-totals may be separated by customer. While the concept of "banding" has been used in various contexts, the concept of banded report generation from a report template has not previously been applied to a spreadsheet.

FIG. 23 is a diagram illustrating an exemplary report generated from a report template in accordance with various embodiments of the invention. As shown, sub-totals associated with each order grouping and customer grouping are presented. The groups are selected via a user database query (which may include groups and sorting criteria), which defines the groupings to be applied within the template. The user may, however, choose to associate various groups with selected row(s). From these groups, the user may further select one or more of the cells within a specific group for formatting (or formula entry) via the editor, which will be described in further detail below with respect to FIGS. 24 through 28.

In accordance with one aspect of the invention, the user creates the report from within a spreadsheet format. In other words, the user views and establishes the format of the report from within the spreadsheet. FIG. 24 is a diagram illustrating a selection of a report range within an editor in accordance with various embodiments of the invention. Specifically, a report range is a range of cells that is selected by the user for which the report template is to be generated. A range of cells may be selected via use of a mouse or other input device by drawing a rectangle surrounding the desired cells. In this example, cells defined by rows 1-8 and columns A-G are included within the selected report range, as defined by the rectangular line. The user may then edit this range in order to associate various formatting with the report template.

When in a design mode, the user may format the report range as a report template based upon the grouping and sorting specified in the associated user database query. The user may use various standard cell formatting commands, chart wizard, and font dialogs to edit the report range. A chart wizard is generally a series of dialogue boxes that are used to build a chart (e.g., spreadsheet).

FIG. 25 is a diagram illustrating a selection of a report group within an editor in accordance with various embodiments of the invention. As described above, the user may define and select groups by specifying these groups (e.g., customer, order) within the user database query. These groups are then associated with rows within the spreadsheet report template by the user. Specifically, each group may be associated with one or more rows. In this example, the customer group is associated with rows 1, 2, and 8 based upon the query. Since each row is associated with a grouping level, this controls how the template is expanded when the report is eventually run by the user. For instance, a user may establish formatting in association with a row (and therefore a group) as well as provide formulas (which may include individual database field references) in cells. Formatting may include, but is not limited to, cell formatting, outlining, modifying row height and column width, adding hyperlinks, formatting cell values, draw objects, and charts.

In addition, the editor provides additional functionality. A user may enter virtual references. In addition, a user may insert a row, adding a row to a grouping level. Similarly, a user may insert a column, which adds a column to the report range.

FIG. 26 is a diagram illustrating a selection of a report band within an editor in accordance with various embodiments of the invention. A report band may be selected by the user, such as a header band. A header band may be used for each group within a report template. In this example, a first report band corresponds to the customer header band in rows 1 and 2 indicating the customer for which data is presented. Similarly, the second report band corresponds to the order band in row 3 indicating the order(s) for which data is presented. FIG. 27 is a diagram illustrating a banding guide provided in accordance with various embodiments of the invention. A banding guide is defined by the rectangular area adjacent to the template, shown at the right of the grid shown in FIG. 27. This banding guide is a user-hint window (i.e., legend) that indicates those groups that are associated with the corresponding rows to the left of the user-hint window, as well as the associated report bands (e.g., headers). The banding guide may be hidden if not desired. This enables the user to easily format the report template as desired. In this manner, a user may format a spreadsheet report to be generated. The user may therefore have a clearer idea of the appearance of the formatting of a spreadsheet report with respect to the data to be obtained from a database.

FIG. 28 is a diagram illustrating a virtual reference in association with a customer report group in accordance with various embodiments of the invention. As shown, the user may enter a virtual reference within a spreadsheet template. Specifically, as shown in cells F6 and F8, the virtual reference "@F5" are designated. Through the use of the user-hint window, the user may easily ascertain the appropriate placement of a virtual reference within the spreadsheet report template. Specifically, a virtual reference can be inserted into a formula by clicking or selecting a cell or cells within the report range. In this example, the virtual reference created is qualified depending on the context (e.g., placement) of the containing formula's position within the grid (e.g., grouping).

The present invention enables complex financial and mathematical data to be formatted and calculated with respect to ranges of cells of an indeterminate length, even when that data is grouped and intermixed with summary information. Through the use of the present invention, a spreadsheet template may be used to provide information with respect to the grouping and formatting of data that will be obtained from a database. In this manner, a spreadsheet report may be generated using the spreadsheet template and data obtained from a database without requiring a user to manually format the report each time the data is refreshed from the database, or obtained from an alternate database. Accordingly, the present invention enables reports to be formatted and generated from within a spreadsheet format such as Excel.

Further, the manipulations performed are often referred to in terms, such as storing, providing, or generating. In any of the operations described herein that form part of the present invention, these operations are machine operations. Useful machines for performing the operations of the present invention include general purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Referring back to FIG. 1, a preferred computer system invention includes a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, amass storage unit, a keyboard, and a clock.

In one embodiment, the CPU is preferably one or more microprocessor chips selected from complex instruction set computer (CISC) microprocessors, reduced instruction set computer (RISC) microprocessors, or other available microprocessors. The CPU is coupled to a memory by a bi-directional data bus, but may also be coupled by a unidirectional data bus in the case of ROM. The memory is also coupled to the CPU by appropriate control and address busses, as is well known to those skilled in the art.

The CPU is coupled to the I/O circuitry by a bi-directional data bus to permit data transfers with peripheral devices. I/O circuitry preferably includes a number of latches, registers and direct memory access (DMA) controllers. The purpose of the I/O circuitry is to provide an interface between CPU and such peripheral devices as display assembly, mass storage (e.g., disks), keyboard, and clients. The display assembly of server receives data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store report templates (e.g., template objects) of this invention, programs for accessing or generating such report templates, programs for viewing such report templates, and programs for generating a report from such report templates.

The keyboard communicates with the CPU via data bus and I/O circuitry. In addition to keyboard, other types of input device can also be used in conjunction with the present invention. For example, a computer mouse, a track ball, a track pad, or a pen-based tablet can be used to manipulate a pointer on display screen. A clock preferably comprises a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices which can access the report templates (e.g., report objects) or report template generating software on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

It is also within the scope of this invention to implement the apparatus and methods for generating, storing, viewing, and accessing report templates and report template objects on a "stand-alone" computer which does not form part of a network.

Although the foregoing invention has been described in some detail for purposes of clarity of understanding, it will be apparent that certain changes and modifications may be practiced within the scope of the appended claims. For instance, although the specification has described an example employing objects used to generate a report template and associated spreadsheet report, different types of objects and data structures may be used as well. Moreover, the implementation of formulas within a report template is merely illustrative, and a formula and associated virtual reference may be represented and resolved in other manners as well. In addition, although the resolution of virtual references is performed during generation of a report in the above-described embodiments; expansion may also be performed prior to generation of the report from the report template. In other words, expansion may result in modification of the report-template. In addition, the reader will understand that the report template described herein can be used in contexts other than sales reports. For example, the report template disclosed herein may be used with employment reports, scientific reports, etc. and their equivalents.

What is claimed is:

1. A method of generating a report template from a grid having a plurality of cells, the report template being adapted for creating a spreadsheet report having a plurality of cells using data obtained from a database, the method comprising:

displaying the grid such that the grid operates as a user interface;

identifying one or more database fields for which data is to be obtained from a database, each of the one or more database fields being associated with a separate group with which one or more rows in the grid can be associated;

associating one or more groups as defined by the one or more database fields of the database with a corresponding set of one or more rows in the grid, thereby associating cells within the set of rows with the corresponding group;

receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;

generating the report template from the received information such that one or more of the groups are associated with the received information corresponding to placement of the received information within the grid; and automatically converting each of the one or more virtual cell locations to one or more actual cell locations within the grid when the spreadsheet report is generated from the report template using the data obtained from the database, thereby enabling the formula to be applied to data in the actual cell locations;

wherein the actual cell locations correspond to expected placement of the data when the spreadsheet report is generated from the report template using the data obtained from the database;

wherein the one or more virtual cell locations identifies a first set of one or more cells in the grid and the one or more actual cell locations identifies a second set of one or more cells in the grid, wherein first set of one or more cells in the grid is different from the second set of one or more cells in the grid;

wherein each of the formulas is not applied to the corresponding first set of one or more cells in the grid to calculate a numerical value.

2. The method as recited in claim 1, wherein each of the cells of the grid is capable of receiving at least one of a data value, a database field reference, reference to one or more cells within the grid, or formula to be applied to contents of one or more of the plurality of cells.

3. The method as recited in claim 1, wherein the report template includes the grid.

4. The method as recite in claim 1, wherein the report template includes a subset of the plurality of cells of the grid.

5. The method as recited in claim 4, further comprising:
identifying the subset of the plurality of cells of the grid to be included in the report template.

6. The method as recited in claim 1, wherein the received information is associated with one or more of the identified database fields for which data is to be obtained from a database.

7. The method as recited in claim 1, wherein generating the report template from the received information comprises associating the groups with at least one of a format of the spreadsheet report or the information indicating information to be displayed in one or more cells of the spreadsheet report.

8. The method as recited in claim 1, further comprising:
displaying the report template, the report template graphically representing a spreadsheet report.

9. The method as recited in claim 8, wherein the spreadsheet report is in an Excel format.

10. The method as recited in claim 1, wherein the received information further includes a format of the spreadsheet report to be created, wherein the format includes formatting of information within one or more of the plurality of cells.

11. The method as recited in claim 10, wherein the format comprises one or more headers associated with one or more of the groups.

12. The method as recited in claim 1, wherein each of the formulas includes a reference to one or more of the plurality of cells.

13. The method as recited in claim 1, wherein generating the report template from the received information comprises associating each of the formulas with one or more of the groups corresponding to the location of the cells within the grid in which the formulas are placed.

14. The method as recited in claim 1, wherein each of the virtual cell locations is identified by a row identifier and a column identifier.

15. The method as recited in claim 1, further comprising:
automatically modifying the reference to the one or more virtual cell locations.

16. The method as recited in claim 15, wherein automatically modifying the reference to the one or more virtual cell locations is performed when the relative position of the reference to the one or more virtual cell locations changes.

17. The method as recited in claim 15, wherein automatically modifying the reference to the one or more virtual cell locations is performed when one or more rows or columns are inserted or deleted.

18. The method as recited in claim 1, wherein the one or more virtual cell locations within the grid are distinguished from actual cell references by a predefined symbol.

19. The method as recited in claim 1, wherein the converting is performed during generation of a report from the report template using the data obtained from the database.

20. The method as recited in claim 1, further comprising:
generating a spreadsheet report from the report template using data obtained from a database and the report template.

21. The method as recited in claim 20, the method further comprising:
generating a DRML file including the data obtained from the database and the report template.

22. The method as recited in claim 21, wherein the DRML file includes a grouping tag identifying one of the groups.

23. The method as recited in claim 21, wherein the DRML file includes a virtual name associated with a formula including a reference to one or more virtual cell locations.

24. The method as recited in claim 23, wherein the virtual name is the reference to one or more virtual cell locations.

25. The method as recited in claim 23, further comprising:
obtaining the formula and the virtual name from the DRML file; and
providing the formula in one of the plurality of cells of the spreadsheet report.

26. The method as recited in claim 25, wherein the one of the plurality of cells is identified by one or more row and cell tags in the DRML file following the virtual name.

27. The method as recited in claim 25, wherein providing the formula is performed prior to automatically converting the reference to the one or more virtual cell locations.

28. The method as recited in claim 25, further comprising:
maintaining a list of virtual references including the reference to one or more virtual cell locations.

29. The method as recited in claim 28, wherein the list of virtual references is associated with one of the groups.

30. The method as recited in claim 29, wherein converting and replacing the reference to the one or more virtual cell locations is performed when cell data for the one of the groups has been detected in the DRML file.

31. The method as recited in claim 30, wherein detecting the end of one of the groups is performed by identifying an end group tag.

32. The method as recited in claim 23, further comprising:
maintaining a list of one or more actual references to replace the reference to one or more virtual cell locations.

33. The method as recited in claim 32, further comprising:
updating the list to include a cell location associated with the virtual name.

34. The method as recited in claim 32, further comprising:
ascertaining the cell location from one or more cell tags and one or more row tags within the DRML file that are associated with the virtual name.

35. The method as recited in claim 32, further comprising:
replacing the reference to one or more virtual cell locations in one or more cells in the spreadsheet report with the one or more actual cell references.

36. The method as recited in claim 35, wherein replacing the reference is performed when an end group tag is detected in the DRML file.

37. The method as recited in claim 1, wherein the converting and replacing steps are performed for each of the formulas including a reference to one or more virtual cell locations.

38. The method as recited in claim 37, wherein the converting and replacing steps are performed for each of the formulas in a top-down order in the order in which the formulas are found within the report template.

39. The method as recited in claim 38, wherein the converting and replacing steps are performed in an order according to the groups with which the formulas are associated.

40. The method as recited in claim 1, wherein the converting and replacing steps are performed for each copy of the formula within the grid.

41. The method as recited in claim 40, wherein the copy of the formula is placed in one of the plurality of cells corresponding to the expected placement of the data.

42. The method as recited in claim 1, wherein the converting and replacing steps are performed for each instance of the formulas.

43. The method as recited in claim 1, wherein the converting and replacing steps are performed for each of the formulas corresponding to a sorting order specified in a user database query that identifies the database fields for which the data is to be obtained from the database.

44. The method as recited in claim 1, wherein one or more of the formulas includes a reference to one of the groups that qualifies the virtual cell locations.

45. The method as recited in claim 1, wherein the virtual cell locations are each associated with one of the groups corresponding to the location of the corresponding formula within the grid.

46. The method as recited in claim 45, further comprising:
moving the formula including the reference to one or more virtual cell locations to another one of the plurality of cells.

47. The method as recited in claim 1, wherein one or more of the formulas is not qualified by a group that identifies the virtual cell locations.

48. The method as recited in claim 1, wherein the one or more actual cell locations are calculated to designate locations within the spreadsheet report that will exist after the data is obtained from the database.

49. The method as recited in claim 1, further comprising:
associating one of the groups with a corresponding set of one or more rows in the report template in response to input from a user.

50. The method as recited in claim 1, wherein the one or more database fields are identified in a user query that identifies the database fields for which the data is to be obtained from the database.

51. The method as recited in claim 1, further comprising:
creating the spreadsheet report using the report template and the data obtained from the database.

52. The method as recited in claim 51, wherein creating the spreadsheet report comprises:
providing the spreadsheet report in the grid in which the report template is displayed.

53. The method as recited in claim 52, wherein providing the spreadsheet report is performed simultaneously with displaying the grid in which the report template is displayed.

54. The method as recited in claim 53, further comprising:
modifying the report template displayed, thereby enabling an updated spreadsheet report to be generated.

55. The method as recited in claim 1, further comprising:
performing a subsequent database query to obtain data from a database; and
applying the report template to the obtained data to generate a spreadsheet report.

56. The method as recited in claim 1, further comprising:
receiving a selection of the plurality of cells defining the grid.

57. The method as recited in claim 1, further comprising:
displaying a guide indicating the groups associated with the corresponding rows of the grid, the guide being displayed adjacent to the grid.

58. The method as recited in claim 1, wherein receiving information within one or more of the plurality of cells of the displayed grid includes receiving the information from a user.

59. The method as recited in claim 1, wherein displaying the grid comprises providing a user interface representing a spreadsheet format.

60. The method as recited in claim 1, wherein the virtual reference identifies one or more cell locations in the grid that enable the actual cell locations to be determined based upon the data to be included in the spreadsheet report.

61. The method as recited in claim 1, wherein the virtual reference identifies one or more cell locations that do not correspond to the expected placement of data in the spreadsheet report.

62. The method as recited in claim 1, wherein the actual cell locations are determined during generation of the spreadsheet report in accordance with the data that is retrieved from the database.

63. The method as recited in claim 1, further comprising:
determining the actual cell locations in which data will be placed in the spreadsheet report; and
converting the virtual cell locations to the actual cell locations.

64. The method as recited in claim 1, wherein the actual cell locations are determined after the data has been retrieved from the database.

65. The method as recited in claim 1, wherein each of the formulas is applied to the corresponding second set of one or more cells in the grid to calculate a numerical value.

66. The method as recited in claim 1, further comprising:
applying each of the formulas to numerical values in the corresponding actual cell locations.

67. An apparatus for generating a report template from a grid having a plurality of cells, the report template being adapted for creating a spreadsheet report having a plurality of cells using data obtained from a database, comprising:
means for displaying the grid such that the grid operates as a user interface;
means for identifying one or more database fields for which data is to be obtained from a database, each of the one or more database fields being associated with a separate group with which one or more rows in the grid can be associated;
means for associating one or more groups as defined by the one or more database fields of the database with a corresponding set of one or more rows in the grid, thereby associating cells within the set of rows with the corresponding group;

means for receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;

means for generating the report template from the received information such that one or more of the groups are associated with the received information corresponding to placement of the received information within the grid; and means for automatically converting each of the one or more virtual cell locations to one or more actual cell locations within the grid when the spreadsheet report is generated from the report template, thereby enabling the formula to be applied to data in the actual cell locations;

wherein the actual cell locations correspond to expected placement of the data when the spreadsheet report is generated using the data obtained from the database;

wherein the one or more virtual cell locations identifies a first set of one or more cells in the grid and the one or more actual cell locations identifies a second set of one or more cells in the grid, wherein first set of one or more cells in the grid is different from the second set of one or more cells in the grid;

wherein each of the formulas is not applied to the corresponding first set of one or more cells in the grid to calculate a numerical value.

68. The method as recited in claim 67, further comprising:
generating a spreadsheet report from the report template using data obtained from a database and the report template.

69. The method as recited in claim 68, the method further comprising:
generating a DRML file including the data obtained from the database and the report template.

70. The method as recited in claim 69, wherein converting and replacing are performed using the DRML file.

71. The method as recited in claim 67, wherein receiving one or more formulas within one or more of the plurality of cells of the displayed grid includes receiving the one or more formulas from a user.

72. The method as recited in claim 67, wherein displaying the grid comprises providing a user interface representing a spreadsheet format.

73. A method of generating a report template from a grid having a plurality of cells, the report template being adapted for creating a spreadsheet report having a plurality of cells using data obtained from a database, the method comprising:
displaying the grid such that the grid operates as a user interface;
identifying one or more database fields for which data is to be obtained from a database, each of the one or more database fields being associated with a separate group with which one or more rows in the grid can be associated;
associating one or more groups as defined by the one or more database fields of the database with a corresponding set of one or more rows in the grid, thereby associating cells within the set of rows with the corresponding group;
receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;
generating the report template from the received information such that one or more of the groups are associated with the received information corresponding to placement of the received information within the grid; and
automatically converting each of the one or more virtual cell locations to one or more actual cell locations within the grid when the spreadsheet report is generated from the report template using the data obtained from the database, thereby enabling the formula to be applied to data in the actual cell locations;
wherein the actual cell locations correspond to expected placement of the data when the spreadsheet report is generated from the report template using the data obtained from the database;
wherein the number of rows in the set of rows associated with each of the groups increases when the data is obtained from the database.

74. A method of generating a report template from a grid having a plurality of cells, the report template being adapted for creating a spreadsheet report having a plurality of cells using data obtained from a database, the method comprising:
displaying the grid such that the grid operates as a user interface;
identifying one or more database fields for which data is to be obtained from a database, each of the one or more database fields being associated with a separate group with which one or more rows in the grid can be associated;
associating one or more groups as defined by the one or more database fields of the database with a corresponding set of one or more rows in the grid, thereby associating cells within the set of rows with the corresponding group;
receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;
generating the report template from the received information such that one or more of the groups are associated with the received information corresponding to placement of the received information within the grid; and
automatically converting each of the one or more virtual cell locations to one or more actual cell locations within the grid when the spreadsheet report is generated from the report template using the data obtained from the database, thereby enabling the formula to be applied to data in the actual cell locations;
wherein the actual cell locations correspond to expected placement of the data when the spreadsheet report is generated from the report template using the data obtained from the database;

wherein the virtual cell locations of the report template do not contain numerical values to which the corresponding one of the formulas is to be applied.

75. An apparatus for generating a report template from a grid having a plurality of cells, the report template being adapted for creating a spreadsheet report having a plurality of cells using data obtained from a database, comprising:

a processor; and a memory, at least one of the processor or the memory being adapted for:

displaying the grid such that the grid operates as a user interface;

identifying one or more database fields for which data is to be obtained from a database, each of the one or more database fields being associated with a separate group with which one or more rows in the grid can be associated;

associating one or more groups as defined by the one or more database fields of the database with a corresponding set of one or more rows in the grid, thereby associating cells within the set of rows with the corresponding group;

receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;

generating the report template from the received information such that one or more of the groups are associated with the received information corresponding to placement of the received information within the grid; and automatically converting each of the one or more virtual cell locations to one or more actual cell locations within the grid when the spreadsheet report is generated from the report template using the data obtained from the database, thereby enabling the formula to be applied to data in the actual cell locations;

wherein the actual cell locations correspond to expected placement of the data when the spreadsheet report is generated from the report template using the data obtained from the database;

wherein the one or more virtual cell locations identifies a first set of one or more cells in the grid and the one or more actual cell locations identifies a second set of one or more cells in the grid, wherein first set of one or more cells in the grid is different from the second set of one or more cells in the grid;

wherein each of the formulas is not applied to the corresponding first set of one or more cells in the grid to calculate a numerical value.

76. An apparatus for generating a report template from a grid having a plurality of cells, the report template being adapted for creating a spreadsheet report having a plurality of cells using data obtained from a database, comprising:

a processor; and a memory, at least one of the processor or the memory being adapted for:

displaying the grid such that the grid operates as a user interface;

identifying one or more database fields for which data is to be obtained from a database, each of the one or more database fields being associated with a separate group with which one or more rows in the grid can be associated;

associating one or more groups as defined by the one or more database fields of the database with a corresponding set of one or more rows in the grid, thereby associating cells within the set of rows with the corresponding group;

receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;

generating the report template from the received information such that one or more of the groups are associated with the received information corresponding to placement of the received information within the grid; and automatically converting each of the one or more virtual cell locations to one or more actual cell locations within the grid when the spreadsheet report is generated from the report template using the data obtained from the database, thereby enabling the formula to be applied to data in the actual cell locations;

wherein the actual cell locations correspond to expected placement of the data when the spreadsheet report is generated from the report template using the data obtained from the database;

wherein the virtual cell locations of the report template do not contain numerical values to which the corresponding one of the formulas is to be applied.

77. An apparatus for generating a report template from a grid having a plurality of cells, the report template being adapted for creating a spreadsheet report having a plurality of cells using data obtained from a database, comprising:

a processor; and a memory, at least one of the processor or the memory being adapted for:

displaying the grid such that the grid operates as a user interface;

identifying one or more database fields for which data is to be obtained from a database, each of the one or more database fields being associated with a separate group with which one or more rows in the grid can be associated;

associating one or more groups as defined by the one or more database fields of the database with a corresponding set of one or more rows in the grid, thereby associating cells within the set of rows with the corresponding group;

receiving information within one or more of the plurality of cells of the displayed grid, the received information indicating information to be displayed in one or more cells of the spreadsheet report, wherein the information indicating information to be displayed in one or more cells of the spreadsheet report includes one or more formulas, wherein one or more of the formulas refers to one or more virtual cell locations within the grid;

generating the report template from the received information such that one or more of the groups are associated with the received information corresponding to placement of the received information within the grid; and automatically converting each of the one or more virtual cell locations to one or more actual cell locations within the grid when the spreadsheet report is generated from the report template using the data obtained from the database, thereby enabling the formula to be applied to data in the actual cell locations;

wherein the actual cell locations correspond to expected placement of the data when the spreadsheet report is generated from the report template using the data obtained from the database;

wherein the number of rows in the set of rows associated with each of the groups increases when the data is obtained from the database.

* * * * *